(12) United States Patent
Frisco et al.

(10) Patent No.: US 7,707,612 B2
(45) Date of Patent: Apr. 27, 2010

(54) AIRCRAFT IN-FLIGHT ENTERTAINMENT SYSTEM WITH SOFT FAIL AND FLIGHT INFORMATION FEATURES AND ASSOCIATED METHODS

(75) Inventors: Jeffrey A. Frisco, Palm Bay, FL (US); Michael Keen, Malabar, FL (US)

(73) Assignee: Live TV, Inc., Melbourne, FL (US)

( * ) Notice: Subject to any disclaimer, the term of this patent is extended or adjusted under 35 U.S.C. 154(b) by 1263 days.

(21) Appl. No.: 10/716,987

(22) Filed: Nov. 19, 2003

(65) Prior Publication Data

US 2004/0078821 A1 Apr. 22, 2004

Related U.S. Application Data

(62) Division of application No. 09/545,267, filed on Apr. 7, 2000, now abandoned.

(51) Int. Cl.
*H04N 7/18* (2006.01)
*G06F 11/00* (2006.01)
*H04N 7/20* (2006.01)

(52) U.S. Cl. .............................. 725/76; 725/71; 714/57

(58) Field of Classification Search .................. 725/72, 725/76, 75, 71
See application file for complete search history.

(56) References Cited

U.S. PATENT DOCUMENTS

| | | | |
|---|---|---|---|
| 4,413,263 A | 11/1983 | Amitay et al. | 343/756 |
| 4,604,624 A | 8/1986 | Amitay et al. | 342/361 |
| 5,027,124 A | 6/1991 | Fitzsimmons et al. | 342/362 |
| 5,055,660 A | 10/1991 | Bertagna et al. | 235/472 |
| 5,123,015 A | 6/1992 | Brady, Jr. et al. | 370/112 |
| 5,214,505 A | 5/1993 | Rabowsky et al. | 358/86 |
| 5,220,419 A | 6/1993 | Sklar et al. | 358/86 |
| 5,289,272 A | 2/1994 | Rabowsky et al. | 348/8 |
| 5,309,167 A | 5/1994 | Cluniat et al. | 343/840 |
| 5,311,302 A | 5/1994 | Berry et al. | 348/14 |
| 5,524,272 A | 6/1996 | Podowski et al. | 455/3.2 |
| 5,555,466 A | 9/1996 | Scribner et al. | 348/8 |
| 5,568,484 A | 10/1996 | Margis | 370/85.5 |
| 5,600,365 A | 2/1997 | Kondo et al. | 348/8 |
| 5,617,108 A | 4/1997 | Silinsky et al. | 343/786 |
| 5,617,331 A | 4/1997 | Wakai et al. | 364/514 A |

(Continued)

FOREIGN PATENT DOCUMENTS

EP 0557058 A1 8/1993

(Continued)

*Primary Examiner*—Dominic D Saltarelli
*Assistant Examiner*—Chris Parry
(74) *Attorney, Agent, or Firm*—Allen, Dyer, Doppelt, Milbrath & Gilchrist, P.A.

(57) ABSTRACT

An aircraft in-flight entertainment system preferably includes, in one embodiment, a satellite TV receiver, at least one passenger video display connected to the receiver, and a processor connected to the receiver for determining an undesired condition and for generating a substitute image on the passenger video display rather than permit display of an undesired image which would otherwise be produced. The undesired condition may relate to a weak signal or component malfunction. Accordingly, the undesired image may be an undesired default text message or a degraded picture image. Other embodiments of the in-flight entertainment system are directed to providing a moving map image flight information channel integrated with the programming channels of the system.

22 Claims, 18 Drawing Sheets

U.S. PATENT DOCUMENTS

| | | | |
|---|---|---|---|
| 5,649,318 A | 7/1997 | Lusignan | 455/3.2 |
| 5,745,159 A | 4/1998 | Wax et al. | 348/8 |
| 5,760,819 A | 6/1998 | Sklar et al. | 348/8 |
| 5,790,175 A | 8/1998 | Sklar et al. | 348/8 |
| 5,801,751 A | 9/1998 | Sklar et al. | 348/8 |
| 5,808,660 A | 9/1998 | Sekine et al. | 348/8 |
| 5,884,219 A | 3/1999 | Curtwright et al. | 701/213 |
| 5,966,442 A | 10/1999 | Sachdev | 380/10 |
| 5,973,722 A | 10/1999 | Wakai et al. | 348/8 |
| 5,990,928 A | 11/1999 | Sklar et al. | 725/72 |
| 5,999,882 A | 12/1999 | Simpson et al. | 702/3 |
| 6,009,465 A | 12/1999 | Decker et al. | 709/219 |
| 6,014,381 A | 1/2000 | Troxel et al. | 370/395 |
| 6,249,913 B1 | 6/2001 | Galipeau et al. | 725/76 |
| 6,507,952 B1 | 1/2003 | Miller et al. | 725/76 |
| 6,580,452 B1 * | 6/2003 | Gangitano | 348/180 |
| 2005/0108759 A1 * | 5/2005 | Arsenault et al. | 725/72 |

FOREIGN PATENT DOCUMENTS

| | | |
|---|---|---|
| FR | 2652701 | 4/1991 |
| JP | 06292038 A | 10/1994 |

\* cited by examiner

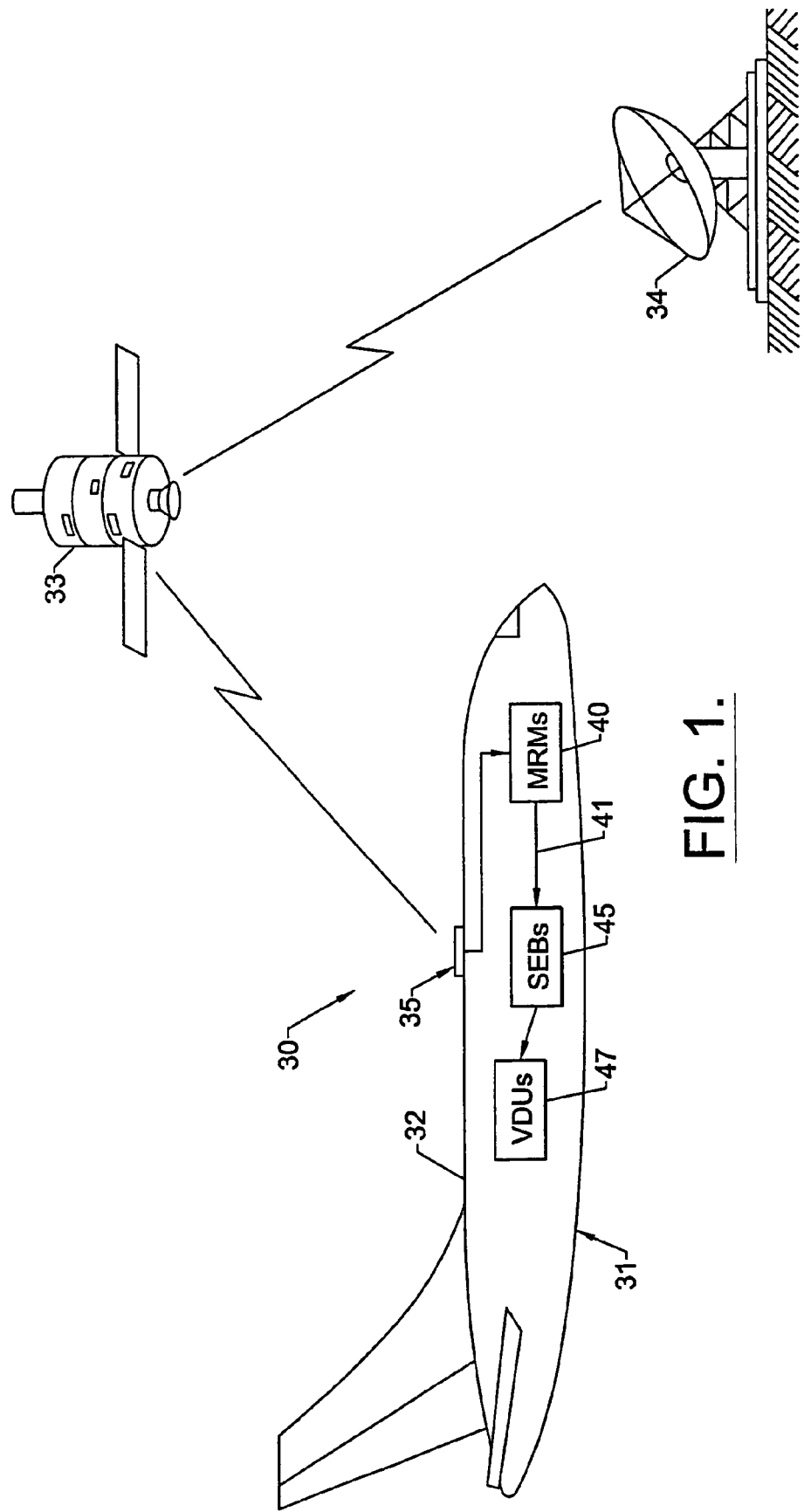

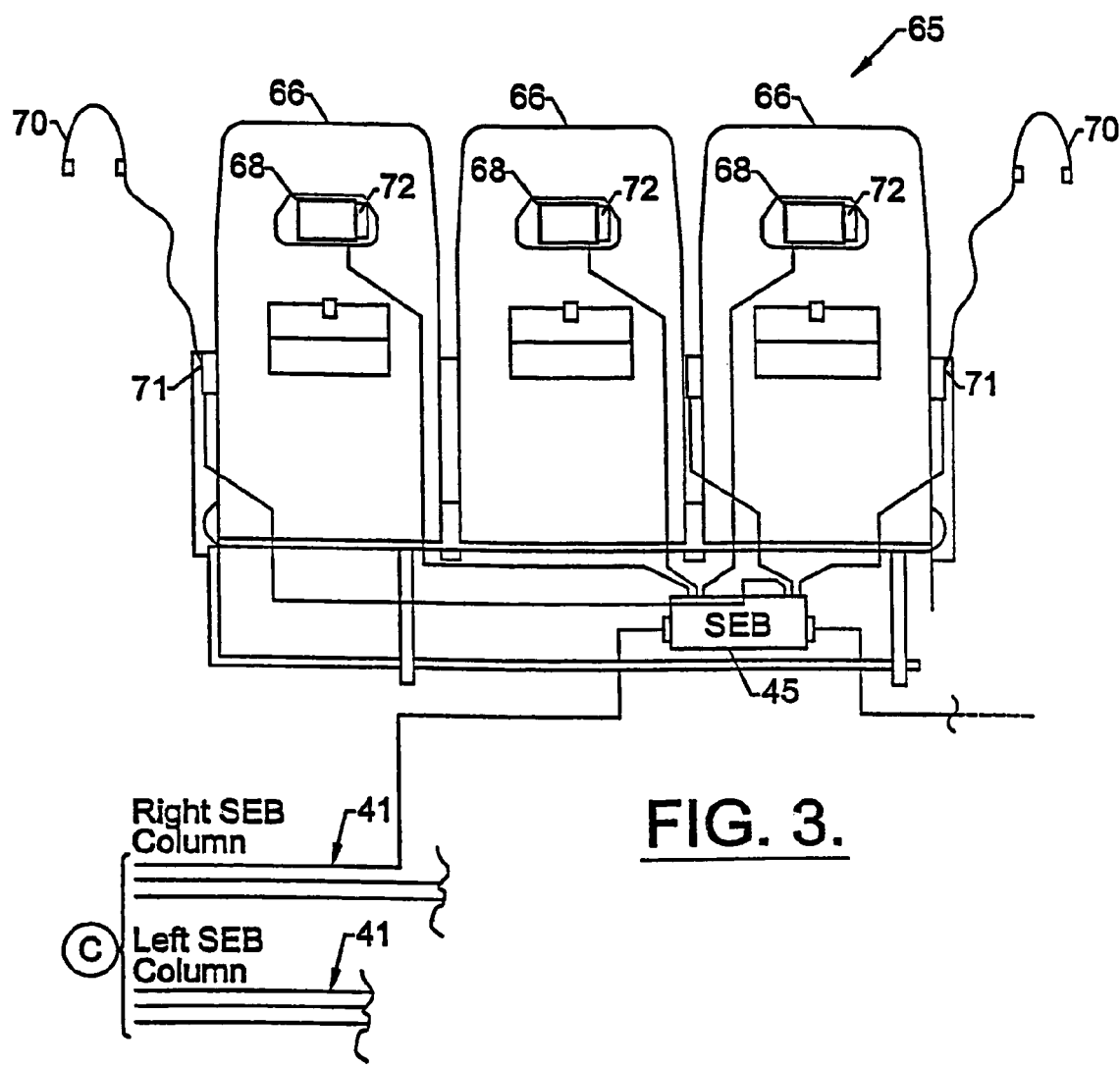

AIRCRAFT IN-FLIGHT ENTERTAINMENT SYSTEM WITH SOFT FAIL AND FLIGHT INFORMATION FEATURES AND ASSOCIATED METHODS

This application is a divisional of Ser. No. 09/545,267 filed on Apr. 7, 2000 now abandoned, the disclosure of which is hereby incorporated by reference in its entirety.

FIELD OF THE INVENTION

The present invention relates to the field of aircraft systems, and, more particularly, to an aircraft in-flight entertainment system and associated methods.

BACKGROUND OF THE INVENTION

Commercial aircraft carry millions of passengers each year. For relatively long international flights, wide-body aircraft are typically used. These aircraft include multiple passenger aisles and have considerably more space than typical so-called narrow-body aircraft. Narrow-body aircraft carry fewer passengers shorter distances, and include only a single aisle for passenger loading and unloading. Accordingly, the available space for ancillary equipment is somewhat limited on a narrow-body aircraft.

Wide-body aircraft may include full audio and video entertainment systems for passenger enjoyment during relatively long flights. Typical wide-body aircraft entertainment systems may include cabin displays, or individual seatback displays. Movies or other stored video programming is selectable by the passenger, and payment is typically made via a credit card reader at the seat. For example, U.S. Pat. No. 5,568,484 to Margis discloses a passenger entertainment system with an integrated telecommunications system. A magnetic stripe credit card reader is provided at the telephone handset and processing to approve the credit card is performed by a cabin telecommunications unit.

In addition to prerecorded video entertainment, other systems have been disclosed including a satellite receiver for live television broadcasts, such as disclosed in French Patent No. 2,652,701 and U.S. Pat. No. 5,790,175 to Sklar et al. The Sklar et al. patent also discloses such a system including an antenna and its associated steering control for receiving both RHCP and LHCP signals from direct broadcast satellite (DBS) services. The video signals for the various channels are then routed to a conventional video and audio distribution system on the aircraft which distributes live television programming to the passengers.

In addition, U.S. Pat. No. 5,801,751 also to Sklar et al. addresses the problem of an aircraft being outside of the range of satellites, by storing the programming for delayed playback, and additionally discloses two embodiments—a full system for each passenger and a single channel system for the overhead monitors for a group of passengers. The patent also discloses steering the antenna so that it is locked onto RF signals transmitted by the satellite. The antenna steering may be based upon the aircraft navigation system or a GPS receiver along with inertial reference signals.

A typical aircraft entertainment system for displaying TV broadcasts may include one or more satellite antennas, headend electronic equipment at a central location in the aircraft, a cable distribution network extending throughout the passenger cabin, and electronic demodulator and distribution modules spaced within the cabin for different groups of seats. Many systems require signal attenuators or amplifiers at predetermined distances along the cable distribution network. In addition, each passenger seat may include an armrest control and seatback display. In other words, such systems may be relatively heavy and consume valuable space on the aircraft. Space and weight are especially difficult constraints for a narrow-body aircraft.

Published European patent application no. 557,058, for example, discloses a video and audio distribution system for an aircraft wherein the analog video signals are modulated upon individual RF carriers in a relatively low frequency range, and digitized audio signals, including digitized data, are modulated upon an RF carrier of a higher frequency to avoid interference with the modulated video RF carriers. All of the video and audio signals are carried by coaxial cables to area distribution boxes. Each area distribution box, in turn, provides individual outputs to its own group of floor distribution boxes. Each output line from a floor distribution box is connected to a single line of video seat electronic boxes (VSEB). The VSEB may service up to five or more individual seats. At each seat there is a passenger control unit and a seat display unit. Each passenger control unit includes a set of channel select buttons and a pair of audio headset jacks. Each display unit includes a video tuner that receives video signals from the VSEB and controls a video display.

A typical cable distribution network within an aircraft may be somewhat similar to a conventional coaxial cable TV system. For example, U.S. Pat. No. 5,214,505 to Rabowsky et al. discloses an aircraft video distribution system including amplifiers, taps and splitters positioned at mutually distant stations and with some of the stations being interconnected by relatively long lengths of coaxial cable. A variable equalizer is provided at points in the distribution system to account for different cable losses at different frequencies. The patent also discloses microprocessor-controlled monitoring and adjustment of various amplifiers to control tilt, that is, to provide frequency slope compensation. Several stations communicate with one another by a separate communication cable or service path independent of the RF coaxial cable. The patent further discloses maintenance features including reporting the nature and location of any failure or degradation of signals to a central location for diagnostic purposes.

One difficulty with conventional DBS in-flight entertainment systems is that a degraded image may be generated based upon a weak receive signal, for example. Of course, a severely degraded image may cause some passengers to question the proper operation of the aircraft. Some DBS systems, may generate a default text message which is also likely to be similarly disconcerting to an aircraft passenger. Yet another shortcoming of some conventional DBS in-flight systems, is that flight specific information is not conveyed to the passenger.

SUMMARY OF THE INVENTION

In view of the foregoing background, it is therefore an object of the present invention to provide an aircraft in-flight entertainment system and related methods avoiding undesired images from passenger video displays.

It is another object of the invention to provide such a system and related method providing useful and desired information to the passengers along with video channels from a satellite TV receiver.

These and other objects, features and advantages in accordance with the present invention are provided in one embodiment by an aircraft in-flight entertainment system comprising a satellite TV receiver, at least one passenger video display connected to the satellite TV receiver, and a processor connected to the satellite TV receiver for determining an undesired condition and for generating a substitute image on the passenger video display rather than permit display of an undesired image which would otherwise be produced. The satellite TV receiver may comprise a direct broadcast satellite (DBS) receiver. The undesired condition may relate to a weak or marginal received signal strength condition, or the undesired condition may relate to a component malfunction. In either case, the processor could determine the weak signal or component malfunction. The system may include a storage device connected to the processor for storing the substitute image.

For example, the undesired image could be a degraded program image which may be disconcerting to the passenger. Alternately, the undesired image could default text message image, such as "searching for satellite" which could also be disconcerting to an air traveler.

The satellite TV receiver may generate a plurality of individual video channels, and the processor may determine the undesired condition for each of the individual video channels. Alternately, the processor may determine the undesired condition for the plurality of video channels.

The at least one passenger video display may comprise a plurality of passenger seatback video displays. In addition, the system may also include signal distribution devices, and a cable network connecting the satellite TV receiver to the signal distribution devices, and connecting the signal distribution devices to the passenger video displays. The system is particularly advantageous for a single-aisle narrow-body aircraft where cost effectiveness and low weight are especially important.

A related method aspect of the invention is for operating an aircraft in-flight entertainment system comprising a satellite TV receiver, and at least one passenger video display connected to the satellite TV receiver. The method preferably comprises determining an undesired condition, and generating a substitute image on the at least one passenger video display rather than permit display of an undesired image which would otherwise be produced. The undesired condition may be a weak received signal and/or a component malfunction.

Another class of embodiments of the invention are directed to providing useful information to the passengers. More particularly, the invention is also directed to an aircraft in-flight entertainment system comprising a satellite TV receiver for generating programming channels, and a moving map image generator for generating a flight information channel including a moving representation of the aircraft position on a map image. The satellite TV receiver may comprise direct broadcast satellite (DBS) receiver. The system also preferably includes at least one passenger video display connected to the satellite TV receiver and the moving map image generator, and at least one passenger control unit associated with a respective passenger video display for permitting passenger selection of one of the programming channels and flight information channel for display on the respective passenger video display. Accordingly, the flight information channel is integrated in with the satellite TV programming channels for the passenger's convenience and information.

The moving map image generator may include a processor for determining an aircraft position during flight. The processor may cooperate with a global positioning system (GPS) receiver for determining position. This GPS receiver may also provide signals for steering a steerable antenna connected to the satellite TV receiver. The processor may further determine at least one of an aircraft direction, aircraft speed and aircraft altitude for display with the moving map image. This information is also generally useful to the passengers.

The at least one passenger video display may comprise a plurality of passenger seatback video displays. In addition, the aircraft in-flight entertainment system may further comprise a plurality of signal distribution devices, and a cable network connecting the satellite TV receiver and the moving map generator to the signal distribution devices, and connecting the signal distribution devices to the passenger video displays. These embodiments of the invention are also particularly advantageous for a narrow-body aircraft having a single longitudinal passenger aisle.

A related method aspect of the invention is for operating an aircraft in-flight entertainment system comprising a satellite TV receiver for generating a plurality of video programming channels, at least one passenger video display connected to the satellite TV receiver, and at least one passenger control unit associated with a respective passenger video display for permitting passenger selection of programming channels for display on the respective passenger video display. The method may include generating a flight information channel including a moving representation of the aircraft position on a map image, and permitting passenger selection of the flight information channel also using the at least one passenger control unit.

BRIEF DESCRIPTION OF THE DRAWINGS

FIG. 1 is a schematic diagram of the overall components of the aircraft in-flight entertainment system in accordance with the present invention.

FIG. 3 is a schematic rear view of a seatgroup of the in-flight entertainment system of the invention.

DETAILED DESCRIPTION OF THE PREFERRED EMBODIMENTS

Figure 2A:
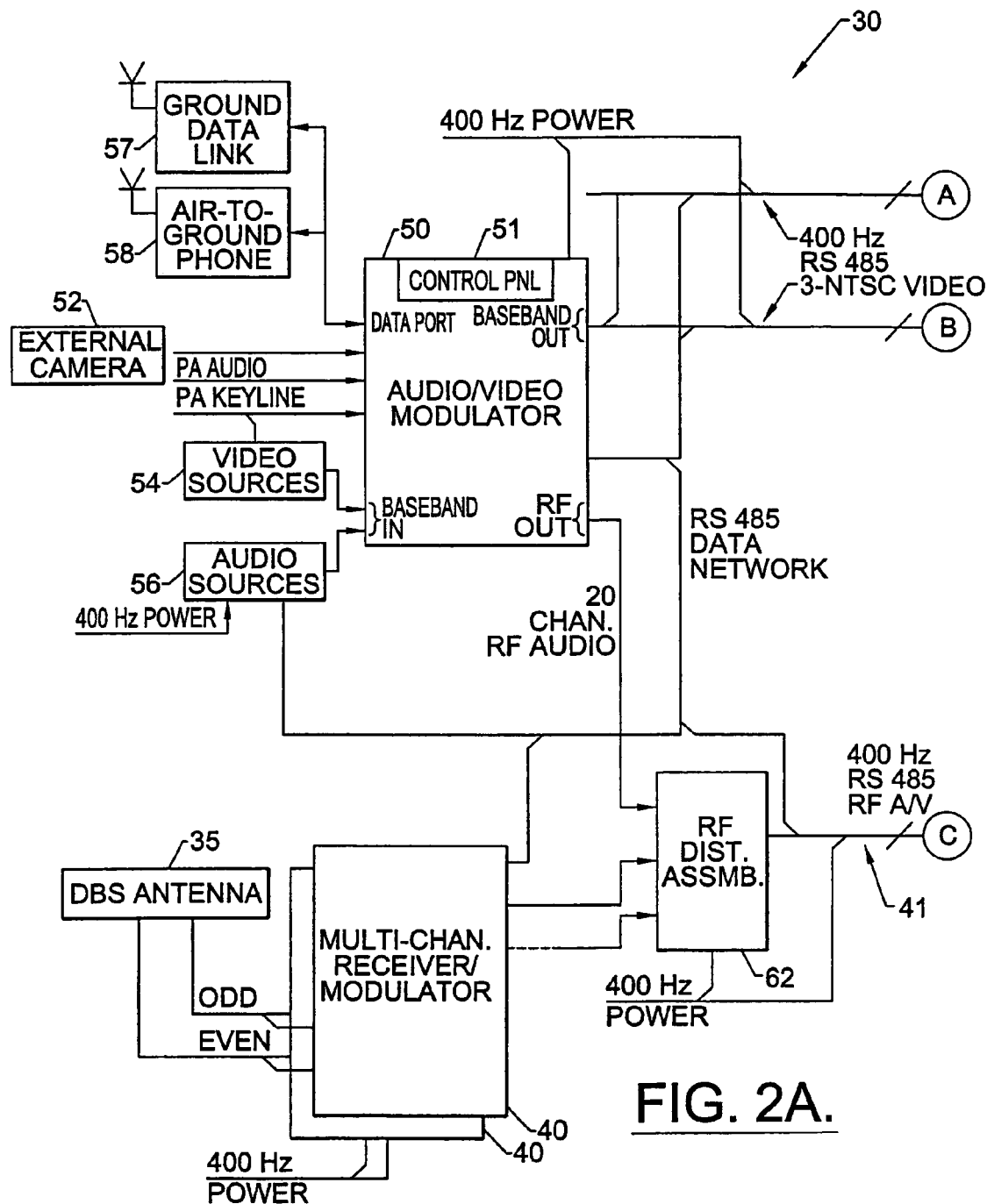
FIGS. 2A and 2B are a more detailed schematic block diagram of an embodiment of the in-flight entertainment system in accordance with the present invention.

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout, and prime notation is used to indicate similar elements in alternate embodiments.

The major components of an in-flight entertainment system 30 in accordance with the present invention are initially described with reference to FIGS. 1 through 3. The system 30 receives television and/or audio broadcast signals via one or more geostationary satellites 33. The geostationary satellite 33 may be fed programming channels from a terrestrial station 34 as will be appreciated by those skilled in the art.

The in-flight entertainment system 30 includes an antenna system 35 to be mounted on the fuselage 32 of the aircraft 31. In addition, the system 30 also includes one or more multichannel receiver modulators (MRMs) 40, a cable distribution network 41, a plurality of seat electronic boxes (SEBs) 45 spaced about the aircraft cabin, and video display units (VDUs) 47 for the passengers and which are connected to the SEBs. In the illustrated embodiment, the system 30 receives, distributes, and decodes the DBS transmissions from the DBS satellite 33. In other embodiments, the system 30 may receive video or TV signals from other classes of satellites as will be readily appreciated by those skilled in the art.

The antenna system 35 delivers DBS signals to the MRMs 40 for processing. For example, each MRM 40 may include twelve DBS receivers and twelve video/audio RF modulators. The twelve receivers recover the digitally encoded multiplexed data for twelve television programs as will be appreciated by those skilled in the art.

Figure 2B:
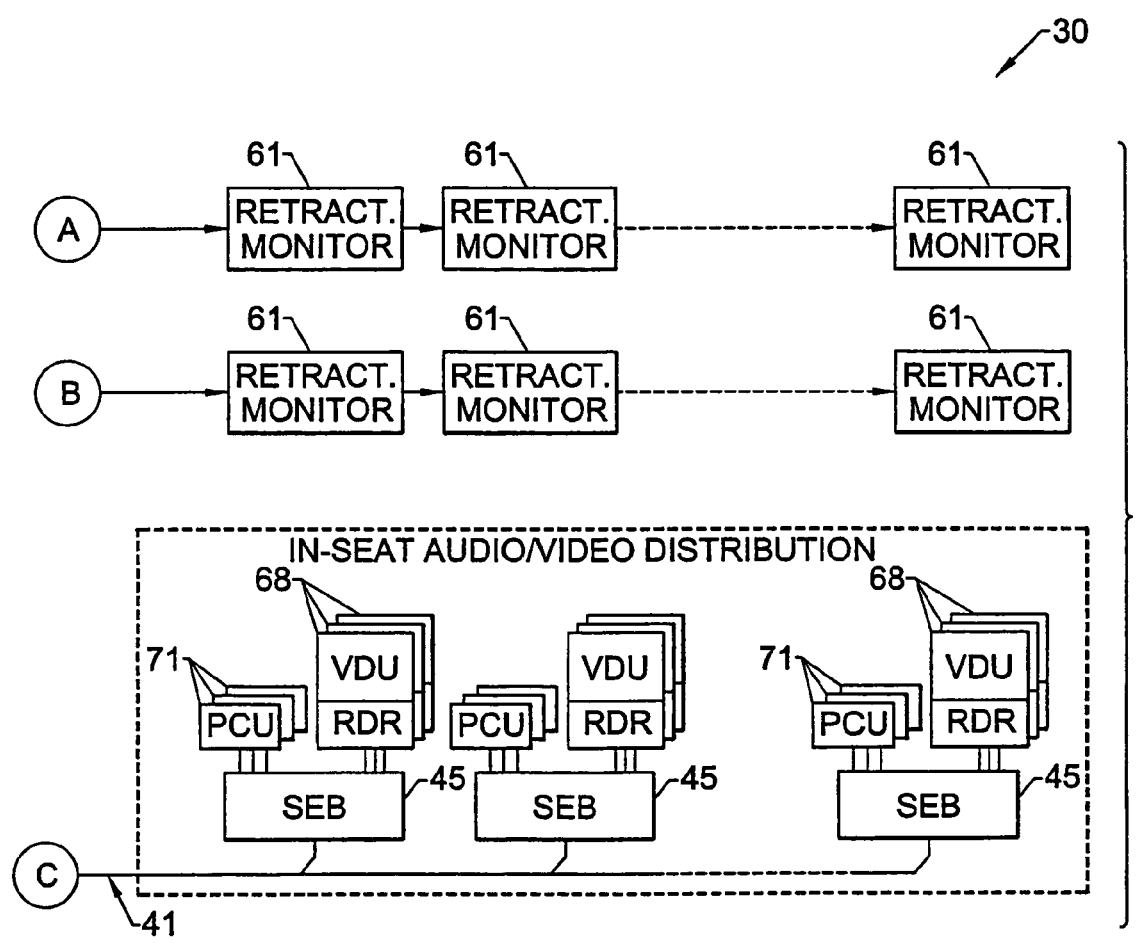

As shown in the more detailed schematic diagram of FIGS. 2A and 2B, an audio video modulator (AVM) 50 is connected to the MRMs 40, as well as a number of other inputs and outputs. The AVM 50 illustratively receives inputs from an external camera 52, as well as one or more other video sources 54, such as videotape sources, and receives signal inputs from one or more audio sources 56 which may also be prerecorded, for example. A PA keyline input and PA audio input are provided for passenger address and video address override. Audio for any receiver along with an associated keyline are provided as outputs from the MRM so that the audio may be broadcast over the cabin speaker system, for example, as will also be appreciated by those skilled in the art. In the illustrated embodiment, a control panel 51 is provided as part of the AVM 50. The control panel 51 not only permits control of the system, but also displays pertinent system information and permits various diagnostic or maintenance activities to be quickly and easily performed.

The AVM 50 is also illustratively coupled to a ground data link radio transceiver 57, such as for permitting downloading or uploading of data or programming information. The AVM 50 is also illustratively interfaced to an air-to-ground telephone system 58 as will be appreciated by those skilled in the art.

The AVM 50 illustratively generates a number of NTSC video outputs which may be fed to one or more retractable monitors 61 spaced throughout the cabin. Power is preferably provided by the aircraft 400 Hz AC power supply as will also be appreciated by those skilled in the art. Of course, in some embodiments, the retractable monitors may not be needed.

The MRMs 40 may perform system control, and status monitoring. An RF distribution assembly (RDA) 62 can be provided to combine signals from a number of MRMs, such as four, for example. The RDA 62 combines the MRM RF outputs to create a single RF signal comprising up to 48 audio/video channels, for example. The RDA 62 amplifies and distributes the composite RF signal to a predetermined number of zone cable outputs. Eight zones are typical for a typical narrow-body single-aisle aircraft 31. Depending on the aircraft, not all eight outputs may be used. Each cable will serve a zone of seatgroups 65 in the passenger cabin.

Referring now more specifically to the lower portion of FIG. 2B and also to FIG. 3, distribution of the RF signals and display of video to the passengers is now further described. Each zone cable 41 feeds the RF signal to a group of contiguous seatgroups 65 along either the right or lefthand side of the passenger aisle. In the illustrated embodiment, the seatgroup 65 includes three side-by-side seats 66, although this number may also be two for other types of conventional narrow-body aircraft.

The distribution cables 41 are connected to the first SEB 45 in each respective right or left zone. The other SEBs 45 are daisy-chained together with seat-to-seat cables. The zone feed, and seat-to-seat cables preferably comprise an RF audio-video coaxial cable, a 400 cycle power cable, and RS 485 data wiring.

For each seat 66 in the group 65, the SEB 45 tunes to and demodulates one of the RF modulated audio/video channels. The audio and video are output to the passenger video display units (VDUs) 68 and headphones 70, respectively. The tuner channels are under control of the passenger control unit (PCU) 71, typically mounted in the armrest of the seat 66, and which also carries a volume control.

Each VDU 68 may be a flat panel color display mounted in the seatback. The VDU 68 may also be mounted in the aircraft bulkhead in other configurations as will be appreciated by those skilled in the art. The VDU 68 will also typically include associated therewith a user payment card reader 72. The payment card reader 72 may be a credit card reader, for example, of the type that reads magnetically encoded information from a stripe carried by the card as the user swipes the card through a slot in the reader as will be appreciated by those skilled in the art. In some embodiments, the credit card data may be processed on the aircraft to make certain processing decisions relating to validity, such as whether the card is expired, for example. As described in greater detail below, the payment card reader 72 may also be used as the single input required to activate the system for enhanced user convenience.

Having now generally described the major components of the in-flight entertainment system 30 and their overall operation, the description now is directed to several important features and capabilities of the system in greater detail. One such feature relates to flexibility or upgradability of the system as may be highly desirable for many airline carriers. In particular, the system 30 is relatively compact and relatively inexpensive so that it can be used on narrow-body aircraft 31, that is, single-aisle aircraft. Such narrow-body aircraft 31 are in sharp contrast to wide-body aircraft typically used on longer overseas flights and which can typically carry greater volumes and weight. The narrow-body aircraft 31 are commonly used on shorter domestic flights The system 30, for example, can be first installed to provide only audio. In addition, the first class passengers may be equipped with seat back VDUs 68, while the coach section includes only aisle mounted video screens. The important aspect that permits upgradability is that the full cable distribution system is installed initially to thereby have the capacity to handle the upgrades. In other words, the present invention permits upgrading and provides reconfiguration options to the air carrier for an in-flight entertainment system and while reducing downtime for such changes.

The cable distribution system is modeled after a conventional ground based cable TV system in terms of signal modulation, cabling, drops, etc. Certain changes are made to allocate the available channels, such as forty-eight, so as not to cause potential interference problems with other equipment aboard the aircraft 31 as will be appreciated by those skilled in the art. In addition, there are basically no active components along the cable distribution path that may fail, for example. The cable distribution system also includes zones of seatgroups 66. The zones provide greater robustness in the event of a failure. The zones can also be added, such as to provide full service throughout the cabin.

Figure 4:
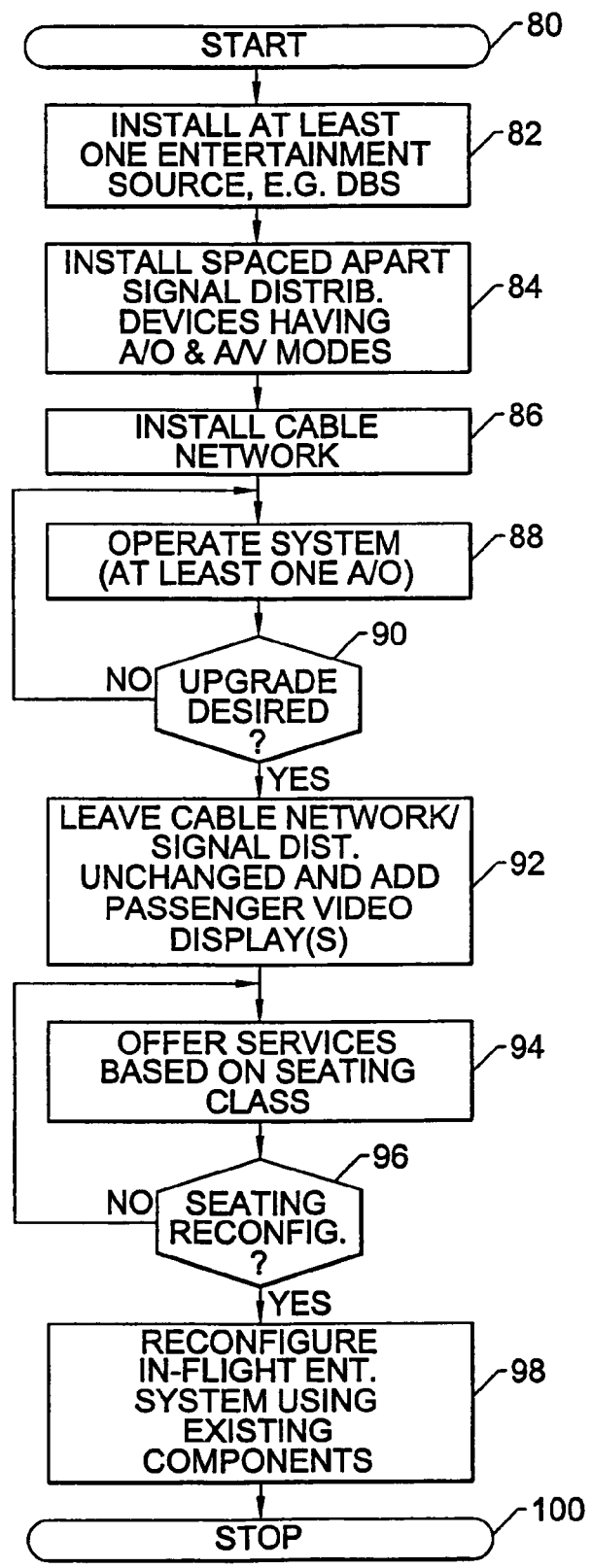
FIG. 4 is a flowchart for a first method aspect relating to the in-flight entertainment system of the invention.

Referring now additionally to the flow chart of FIG. 4, a method for installing and operating an aircraft in-flight entertainment system in accordance with the invention is now described. After the start (Block 80), the method preferably comprises installing at least one entertainment source on the aircraft at Block 82. The entertainment source may include a satellite TV source, such as provided by the DBS antenna system 35 and MRMs 40 described above. The method at Block 84 also preferably includes installing a plurality of spaced apart signal distribution devices, each generating audio signals for at least one passenger in an audio-only mode, and generating audio and video signals to at least one passenger in an audio/video mode. These devices may be the SEBs 45 described above as will be readily appreciated by those skilled in the art. The SEBs 45 include the capability for both audio and video when initially installed to thereby provide the flexibility for upgrading.

At Block 86 the cable network is installed on the aircraft 31 connecting the at least one entertainment source to the signal distribution devices. In other words, the MRMs 40 are connected to the SEBs 45 in the various equipped zones throughout the aircraft 31. Operating the aircraft in-flight entertainment system 30 at Block 88 with at least one predetermined signal distribution device in the audio-only mode, permits initial weight and cost savings since the VDUs 68, for example, may not need to be initially installed for all passengers as will be appreciated by those skilled in the art. For example, a carrier may initially decide to equip first class passengers with both video and audio entertainment options, while coach passengers are initially limited to audio only. Hence, the cost of the VDUs 68 for the coach passengers is initially deferred.

Installing the cabling 41 and SEBs 45 at one time will result in substantial time and labor savings as compared to a piecemeal approach to adding these components at a later time as needed. Accordingly, should an upgrade be desired at Block 90, this may be readily accomplished by connecting at least one VDU 68 to the at least one predetermined signal distribution device, or SEB 45, to operate in the audio/video mode and while leaving the cable network unchanged (Block 92). Accordingly, the downtime experienced by air carrier is greatly reduced over other systems which require significant recabling and other difficult equipment installation operations for upgrading. The method is particularly advantageous for a single-aisle narrow-body aircraft 31 as shown in the illustrated embodiment, where cost effectiveness and low weight are especially important.

As noted above, the entertainment source may preferably comprise a DBS receiver. The step of later upgrading may further comprise leaving the at least one predetermined signal distribution device, such as the SEB 45, unchanged. The step of installing the cable network 41 may comprise installing coaxial cable, power cable and data cable throughout the aircraft as also described above. The step of later upgrading may include installing at least one VDU 68 in the aircraft 31, such as on backs of passenger seats 66.

Of course, the aircraft 31 in some embodiments may include different seating classes as will be appreciated by those skilled in the art. Accordingly, another important aspect of the invention relates to offering different entertainment services based upon the different seating classes at Block 94. In addition, the different seating classes may be reconfigurable, and the step of reconfiguring offered entertainment services may then be based upon reconfiguring of the seating classes. The offering of different entertainment services may comprise offering different packages of television channels, for example. In addition, the step of offering different entertainment services may comprise offering audio-only and audio/video modes of operation based upon seating classes.

Yet another aspect of the invention relates to a method for operating an aircraft in-flight entertainment system 30 for an aircraft 31 when seating classes are reconfigured. Continuing down the flowchart of FIG. 4, this aspect of the method preferably comprises determining whether a reconfiguration is desired at Block 96, and reconfiguring offered entertainment services based upon reconfiguring of the seating classes at Block 98 before stopping at Block 100. For example, the step of offering different entertainment services may include offering different packages of television channels. Alternately, the step of offering different entertainment services may comprise offering audio-only and audio/video modes of operation based upon seating classes. In either case, the reconfiguring can be readily accomplished using the existing cable distribution network 41 and distribution devices, that is, SEBs 45 as will be appreciated by those skilled in the art.

The various upgrading and reconfiguring aspects of the in-flight entertainment system 30 can be performed in a reverse sequence than that illustrated in FIG. 4 and described above. Of course, the upgrade steps may be practiced without the later reconfiguring steps as will be appreciated by those skilled in the art.

Figure 5:
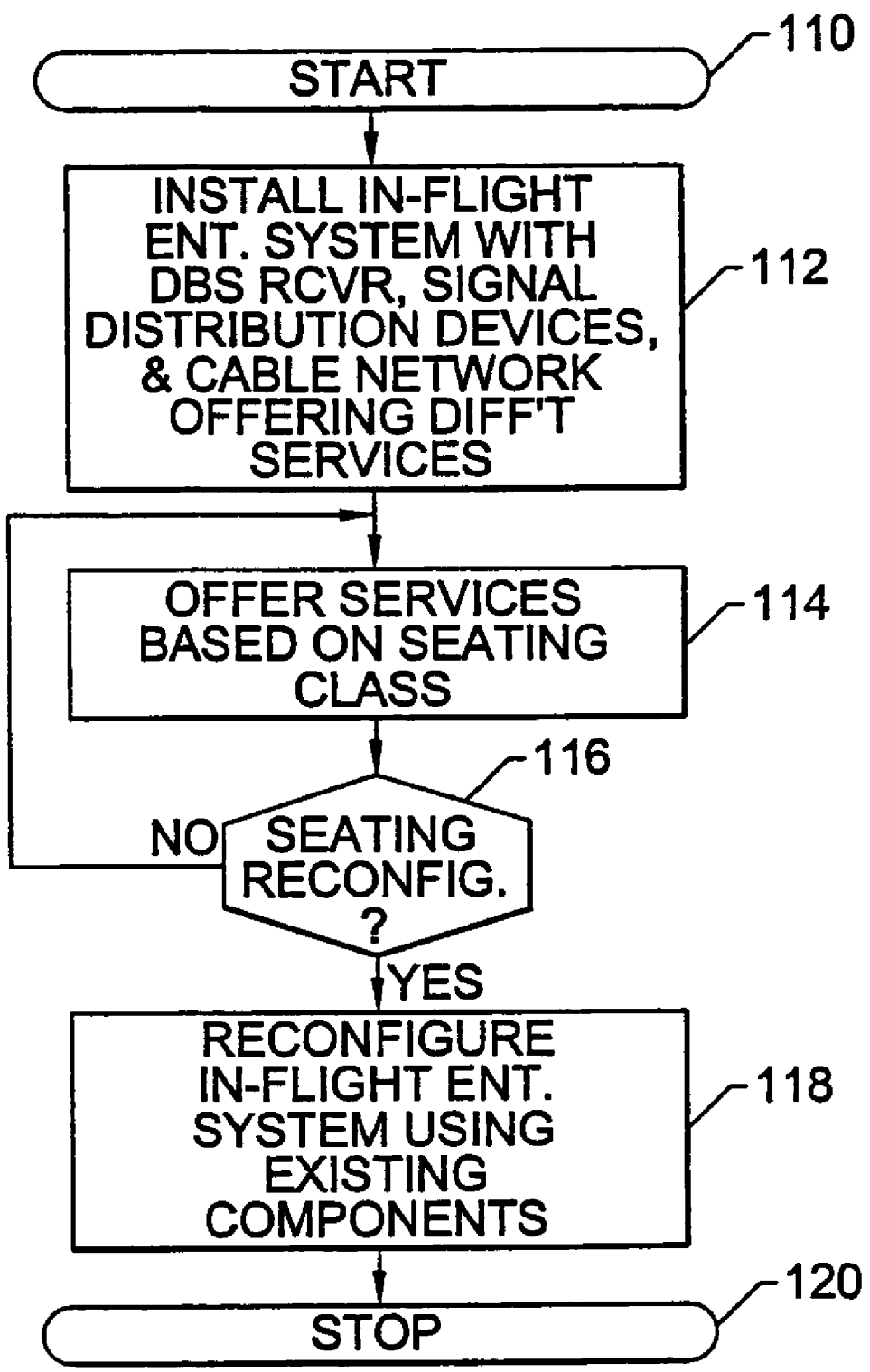
FIG. 5 is a flowchart for a second method aspect relating to the in-flight entertainment system of the invention.

To further illustrate the method aspects, the flowchart of FIG. 5 is directed to the subset of offering different services and later reconfiguring those services based upon reconfiguring seating. More particularly, from the start (Block 110), the in-flight entertainment system 30 is installed at Block 112, and operated offering different services based upon seating class (Block 114), such as offering video to first class passengers, and offering only audio to non-first class passengers. If it is determined that the seating should be reconfigured at Block 116, then the in-flight entertainment system 30 can be readily reconfigured at Block 118 before stopping (Block 120).

Figure 6:
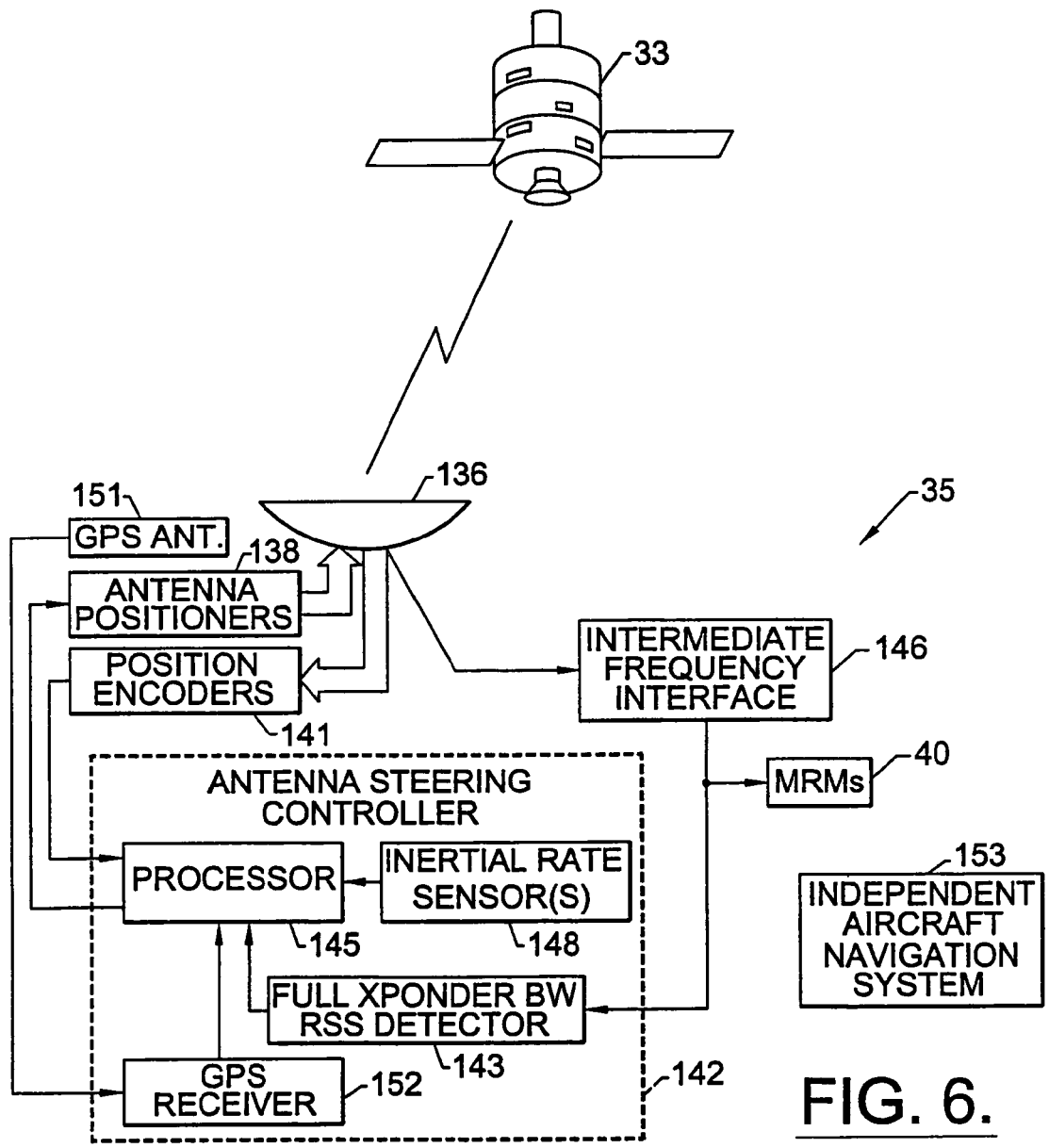
FIG. 6 is a more detailed schematic block diagram of a first embodiment of an antenna-related portion of the in-flight entertainment system of the invention.
Figure 7:
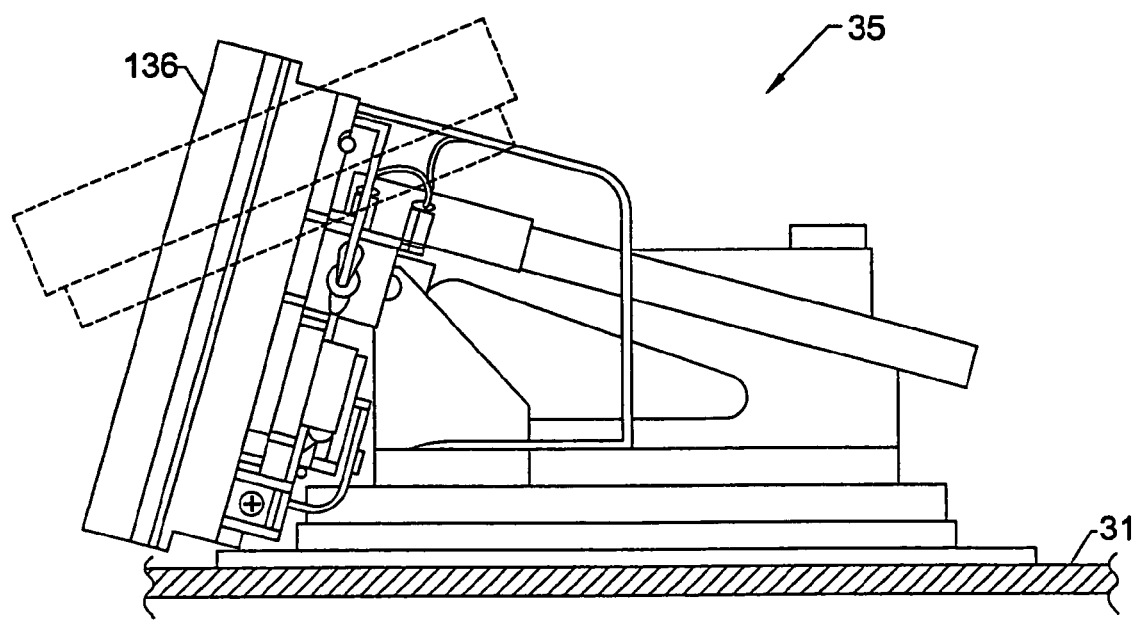
FIG. 7 is a side elevational view of the antenna mounted on the aircraft of the in-flight entertainment system of the invention.

Turning now additionally to FIGS. 6 and 7, advantages and features of the antenna system 35 are now described in greater detail. The antenna system 35 includes an antenna 136 which may be positioned or steered by one or more antenna positioners 138 as will be appreciated by those skilled in the art. In addition, one or more position encoders 141 may also be associated with the antenna 136 to steer the antenna to thereby track the DBS satellite or satellites 33. Of course, a positioning motor and associated encoder may be provided together within a common housing, as will also be appreciated by those skilled in the art. In accordance with one significant advantage of the present invention, the antenna 136 may be steered using received signals in the relatively wide bandwidth of at least one DBS transponder.

More particularly, the antenna system 35 includes an antenna steering controller 142, which, in turn, comprises the illustrated full transponder bandwidth received signal detector 143. This detector 143 generates a received signal strength feedback signal based upon signals received from the full bandwidth of a DBS transponder rather than a single demodulated programming channel, for example. Of course, in other embodiments the same principles can be employed for other classes or types of satellites than the DBS satellites described herein by way of example.

In the illustrated embodiment, the detector 143 is coupled to the output of the illustrated intermediate frequency interface (IFI) 146 which converts the received signals to one or more intermediate frequencies for further processing by the MRMs 40 as described above and as will be readily appreciated by those skilled in the art. In other embodiments, signal processing circuitry, other than that in the IFI 146 may also be used to couple the received signal from one or more full satellite transponders to the received signal strength detector 143 as will also be appreciated by those skilled in the art.

A processor 145 is illustratively connected to the received signal strength detector 143 for controlling the antenna steering positioners 138 during aircraft flight and based upon the received signal strength feedback signal. Accordingly, tracking of the satellite or satellites 33 is enhanced and signal service reliability is also enhanced.

The antenna steering controller 142 may further comprise at least one inertial rate sensor 148 as shown in the illustrated embodiment, such as for roll, pitch or yaw as will be appreciated by those skilled in the art. The rate sensor 148 may be provided by one or more solid state gyroscopes, for example. The processor 145 may calibrate the rate sensor 148 based upon the received signal strength feedback signal.

The illustrated antenna system 35 also includes a global positioning system (GPS) antenna 151 to be carried by the aircraft fuselage 32. This may preferably be provided as part of an antenna assembly package to be mounted on the upper portion of the fuselage. The antenna assembly may also include a suitable radome, not shown, as will be appreciated by those skilled in the art. The antenna steering controller 142 also illustratively includes a GPS receiver 152 connected to the processor 145. The processor 145 may further calibrate the rate sensor 148 based upon signals from the GPS receiver as will be appreciated by those skilled in the art.

As will also be appreciated by those skilled in the art, the processor 145 may be a commercially available microprocessor operating under stored program control. Alternately, discrete logic and other signal processing circuits may be used for the processor 145. This is also the case for the other portions or circuit components described as a processor herein as will be appreciated by those skilled in the art. The advantageous feature of this aspect of the invention is that the full or substantially full bandwidth of the satellite transponder signal is processed for determining the received signal strength, and this provides greater reliability and accuracy for steering the antenna 136.

Another advantage of the antenna system 35 is that it may operate independently of the aircraft navigation system 153 which is schematically illustrated in the lower righthand portion of FIG. 6. In other words, the aircraft 31 may include an aircraft navigation system 153, and the antenna steering controller 142 may operate independently of this aircraft navigation system. Thus, the antenna steering may operate faster and without potential unwanted effects on the aircraft navigation system 153 as will be appreciated by those skilled in the art. In addition, the antenna system 35 is also particularly advantageous for a single-aisle narrow-body aircraft 31 where cost effectiveness and low weight are especially important.

Figure 8:
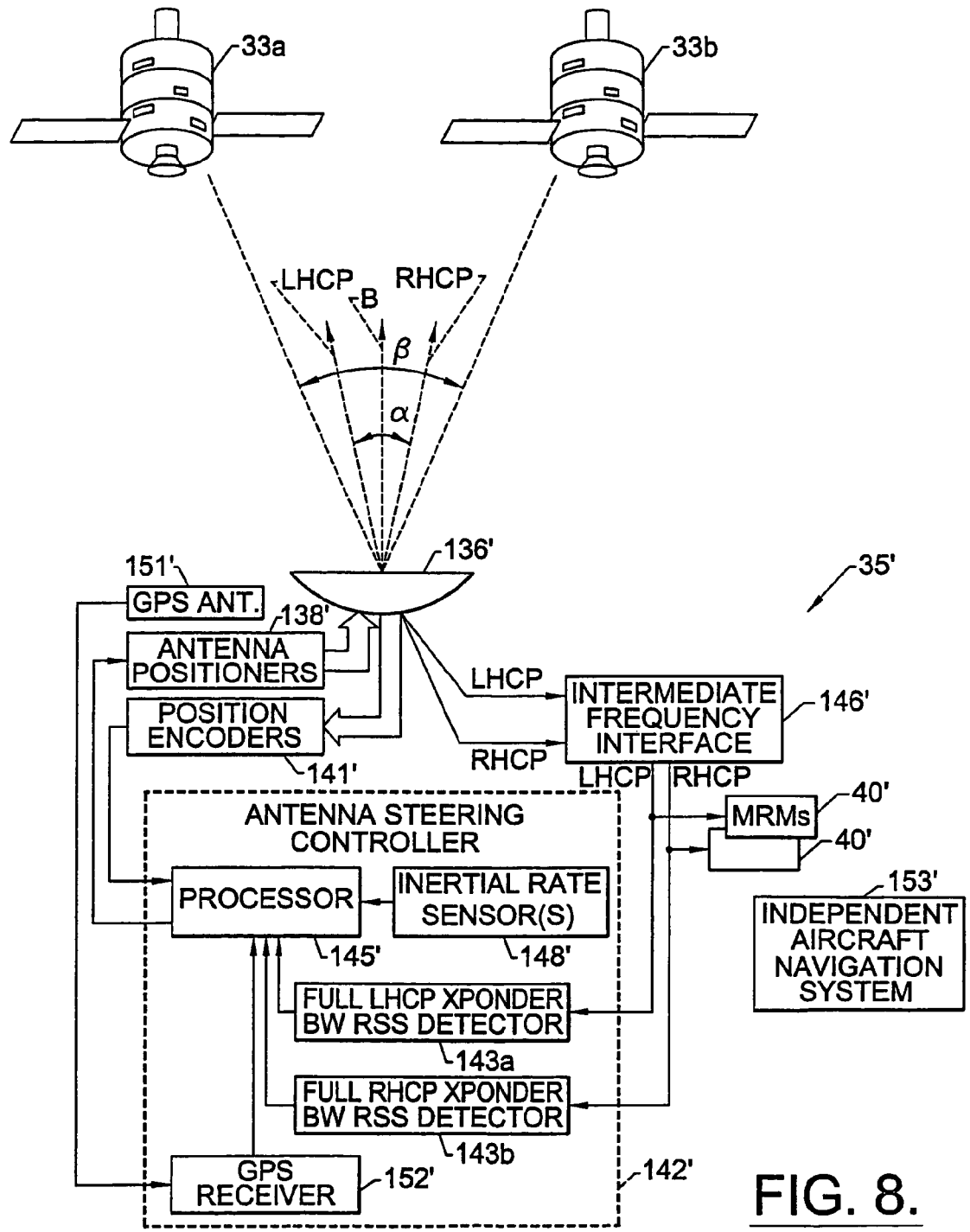
FIG. 8 is a more detailed schematic block diagram of a second embodiment of an antenna-related portion of the in-flight entertainment system of the invention.

Turning now additionally to FIG. 8, another embodiment of the antenna system 35' is now described which includes yet further advantageous features. This embodiment is directed to functioning in conjunction with the three essentially collocated geostationary satellites for the DIRECTV® DBS service, although the invention is applicable in other situations as well. For example, the DIRECTV® satellites may be positioned above the earth at 101 degrees west longitude and spaced 0.5 degrees from each other. Of course, these DIRECTV® satellites may also be moved from these example locations, and more than three satellites may be so collocated. Considered in somewhat broader terms, these features of the invention are directed to two or more essentially collocated geostationary satellites. Different circular polarizations are implemented for reused frequencies as will be appreciated by those skilled in the art.

In this illustrated embodiment, the antenna 136' is a multi-beam antenna having an antenna boresight (indicated by reference B), and also defining right-hand circularly polarized (RHCP) and left-hand circularly polarized (LHCP) beams (designated RHCP and LHCP in FIG. 8) which are offset from the antenna boresight. Moreover, the beams RHCP, LHCP are offset from one another by a beam offset angle $\alpha$ which is greatly exaggerated in the figure for clarity. This beam offset angle $\alpha$ is less than the angle $\beta$ defined by the spacing defined by the satellites 33a, 33b. The transponder or satellite spacing angle $\beta$ is about 0.5 degrees, and the beam offset angle $\alpha$ is preferably less than 0.5 degrees, and may be about 0.2 degrees, for example.

The beam offset angle provides a squinting effect and which allows the antenna 136' to be made longer and thinner than would otherwise be required, and the resulting shape is highly desirable for aircraft mounting as will be appreciated by those skilled in the art. The squinting also allows the antenna to be constructed to have additional signal margin when operating in rain, for example, as will also be appreciated by those skilled in the art.

The multi-beam antenna 136' may be readily constructed in a phased array form or in a mechanical form as will be appreciated by those skilled in the art without requiring further discussion herein. Aspects of similar antennas are disclosed in U.S. Pat. No. 4,604,624 to Amitay et al.; U.S. Pat. No. 5,617,108 to Silinsky et al.; and U.S. Pat. No. 4,413,263 also to Amitay et al.; the entire disclosures of which are incorporated herein by reference.

The processor 145' preferably steers the antenna 136' based upon received signals from at least one of the RHCP and LHCP beams which are processed via the IFI 146' and input into respective received signal strength detectors 143a, 143b of the antenna steering controller 142'. In one embodiment, the processor 145' steers the multi-beam antenna 136' based on a selected master one of the RHCP and LHCP beams and slaves the other beam therefrom.

In another embodiment, the processor 145' steers the multi-beam antenna 136' based on a predetermined contribution from each of the RHCP and LHCP beams. For example, the contribution may be the same for each beam. In other words, the steering or tracking may such as to average the received signal strengths from each beam as will be appreciated by those skilled in the art. As will also be appreciated by those skilled in the art, other fractions or percentages can also be used. Of course, the advantage of receiving signals from two different satellites 33a, 33b is that more programming channels may then be made available to the passengers.

The antenna system 35' may also advantageously operate independent of the aircraft navigation system 153'. The other elements of FIG. 8 are indicated by prime notation and are similar to those described above with respect to FIG. 6. Accordingly, these similar elements need no further discussion.

Another aspect of the invention relates to the inclusion of adaptive polarization techniques which may be used to avoid interference from other satellites. In particular, low earth orbit satellites (LEOS) are planned which may periodically be in position to cause interference with the signal reception by the in-flight entertainment system 30. Adaptive polarization techniques would also be desirable should assigned orbital slots for satellites be moved closer together.

Accordingly, the processor 145' may preferably be configured to perform adaptive polarization techniques to avoid or reduce the impact of such potential interference. Other adaptive polarization techniques may also be used. Suitable adaptive polarization techniques are disclosed, for example, in U.S. Pat. No. 5,027,124 to Fitzsimmons et al; U.S. Pat. No. 5,649,318 to Lusignan; and U.S. Pat. No. 5,309,167 to Cluniat et al. The entire disclosures of each of these patents is incorporated herein by reference. Those of skill in the art will readily appreciate the implementation of such adaptive polarization techniques with the in-flight entertainment system 30 in accordance with the present invention without further discussion.

Figure 10:
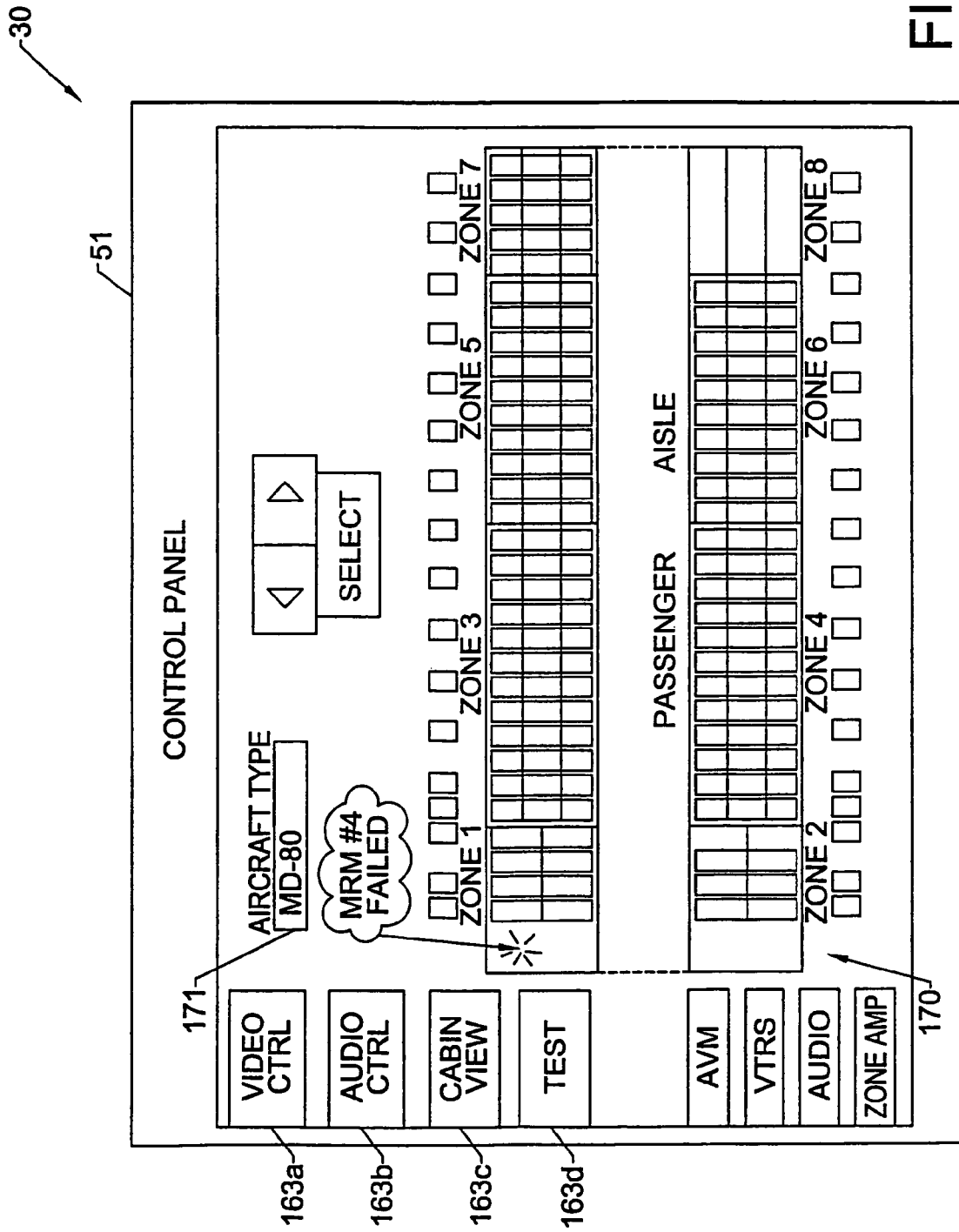
Figure 11:
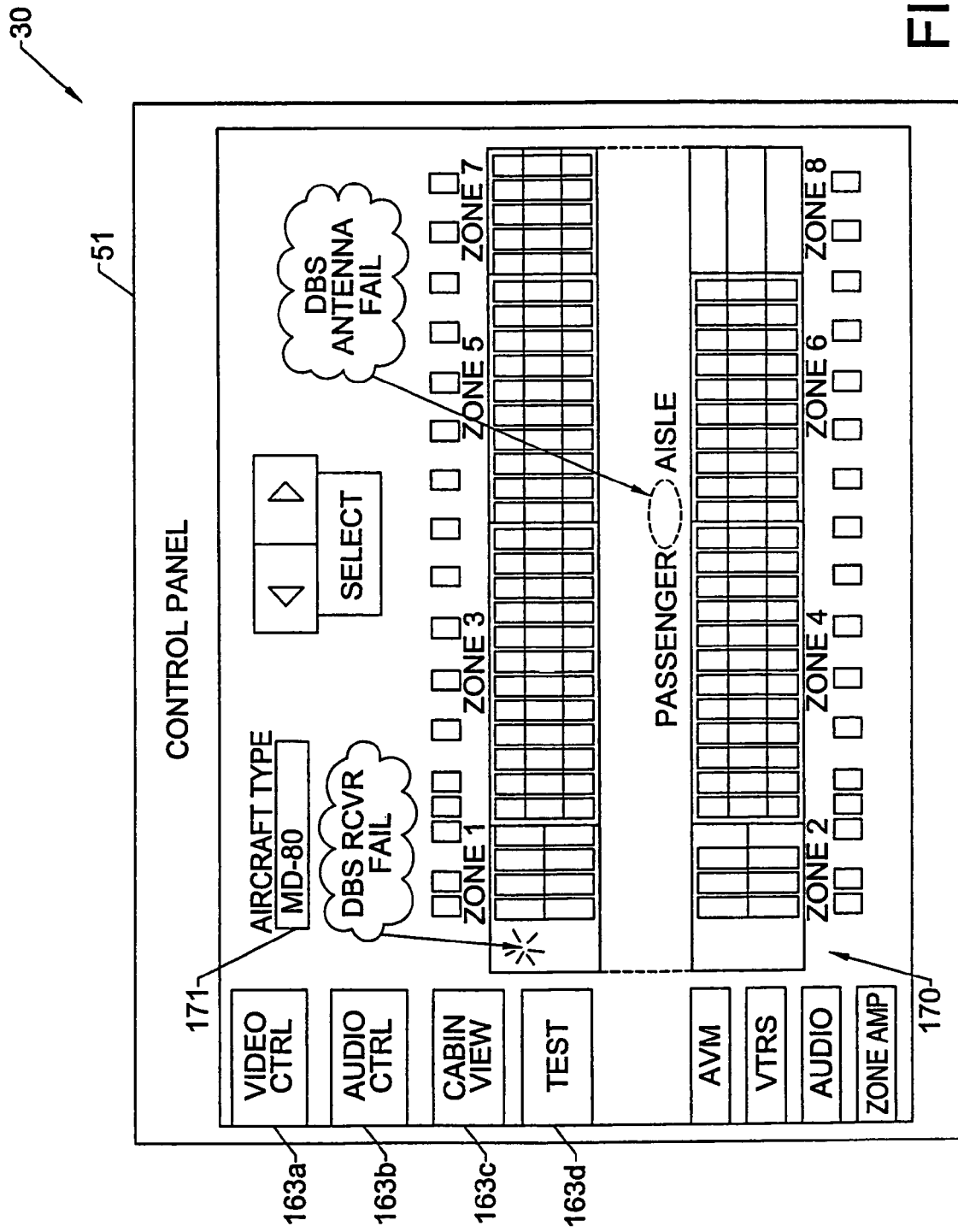

Other aspects and advantages of the in-flight entertainment system 30 of the present invention are now explained with reference to FIGS. 9-11. The system 30 advantageously incorporates a number of self-test or maintenance features. As will be appreciated by those skilled in the art, the maintenance costs to operate such a system 30 could be significantly greater than the original purchase price. Accordingly, the system 30 includes test and diagnostic routines to pinpoint defective equipment. In particular, the system 30 provides the graphical representation of the aircraft seating arrangement to indicate class of service, equipment locations, and failures of any of the various components to aid in maintenance.

Figure 9:
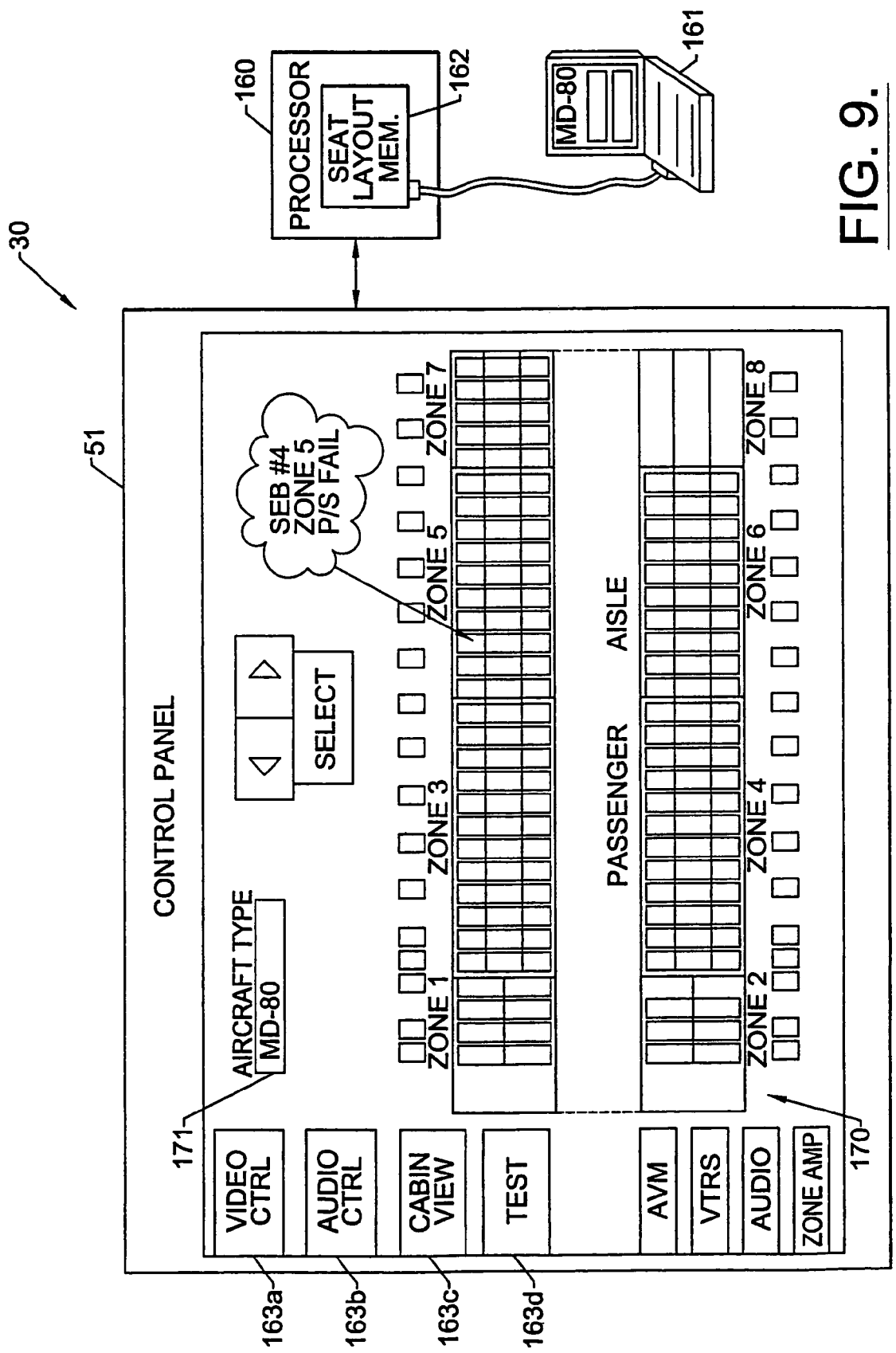
FIGS. 9-11 are simulated control panel displays for the in-flight entertainment system of the invention.

As shown in FIG. 9, the system 30 includes a control panel display 51, and a processor 160 connected to the control panel display. The control panel display 51 and the processor 160 may be part of the AVM 50 (FIG. 2), but could be part of one or more of the MRMs 40 (FIG. 1), or part of another monitoring device as will be appreciated by those skilled in the art. The control panel display 51 may be touch screen type display including designated touch screen input areas 163-163d to also accept user inputs as would also be appreciated by those skilled in the art.

More particularly, the processor 160 generates a seating layout image 170 of the aircraft on the control panel display 51 with locations of the signal distribution devices located on the seating layout image. These locations need not be exact, but should be sufficient to direct the service technician to the correct left or right side of the passenger aisle, and locate the seatgroup and/or seat location for the defective or failed component. In addition, the locations need not be constantly displayed; rather, the location of the component may only be displayed when service is required, for example.

The processor 160 also preferably generates information relating to operation of the signal distribution devices on the display. The signal distribution devices, for example, may comprise demodulators (SEBs 45), modulators (MRMs 40), or the video passenger displays (VDUs 68), for example. Accordingly, a user or technician can readily determine a faulty component and identify its location in the aircraft.

As shown in the illustrated embodiment of FIG. 9, the representative information is a failed power supply module of the #4 SEB of zone 5. In FIG. 10, the information is for a failed #4 MRM. This information is illustratively displayed in text with an indicator pointing to the location of the device. In other embodiments, a flashing icon or change of color could be used to indicate the component or signal distribution device requiring service as will be appreciated by those skilled in the art.

This component mapping and service needed feature of the invention can be extended to other components of the system 30 as will be readily appreciated by those skilled in the art. For example, the processor 160 may further generate information relating to operation of the entertainment source, such as the DBS receiver, or its antenna as shown in FIG. 11. Again, the technician may be guided to the location of the failed component from the seat image layout 170.

Returning again briefly to FIG. 9, another aspect of the invention relates to display of the correct seating layout 170 for the corresponding aircraft 31. As shown, the display 51 may also include an aircraft-type field 171 which identifies the particular aircraft, such as an MD-80. The corresponding seating layout data can be downloaded to the memory 162 or the processor 160 by a suitable downloading device, such as the illustrated laptop computer 161. In other embodiments, the processor 160 may be connected to a disk drive or other data downloading device to receive the seat layout data.

The seat layout data would also typically include the data for the corresponding locations of the devices installed as part of the in-flight entertainment system 30 on the aircraft as will be appreciated by those skilled in the art. Accordingly, upgrades or changes in the system 30 configuration may thus be readily accommodated.

Another aspect of the invention relates to a soft failure mode and is explained with reference to FIGS. 12 and 13. A typical DBS system provides a default text message along the lines "searching for satellite" based upon a weak or missing signal from the satellite. Of course, an air traveler may become disconcerted by such a message, since such raises possible questions about the proper operation of the aircraft. In other systems, a weak received signal may cause the displayed image to become broken up, which may also be disconcerting to the air traveler.

Figure 12:
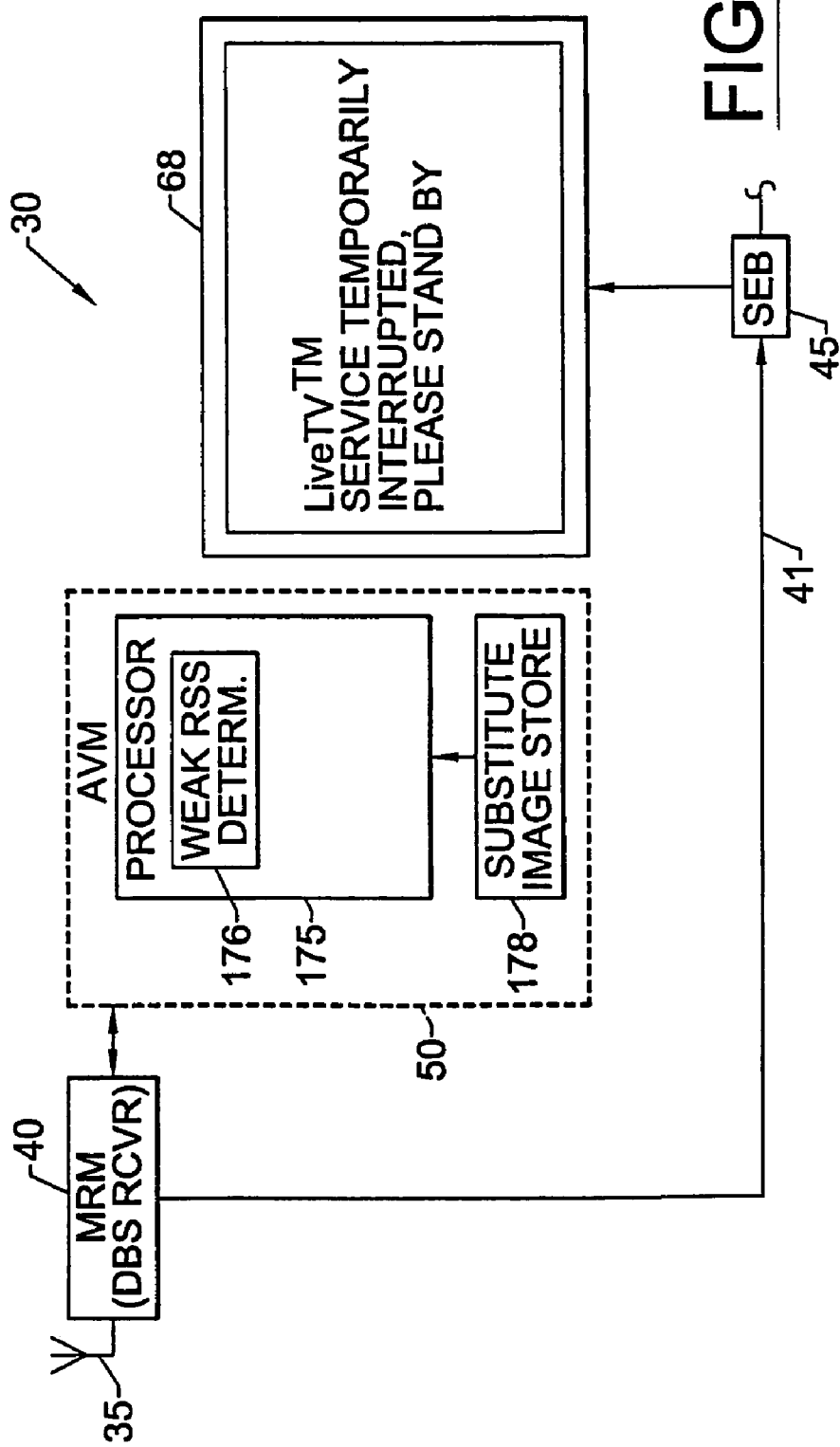
FIG. 12 is a schematic diagram of a portion of the in-flight entertainment system of the invention illustrating a soft-fail feature according to a first embodiment.
Figure 13:
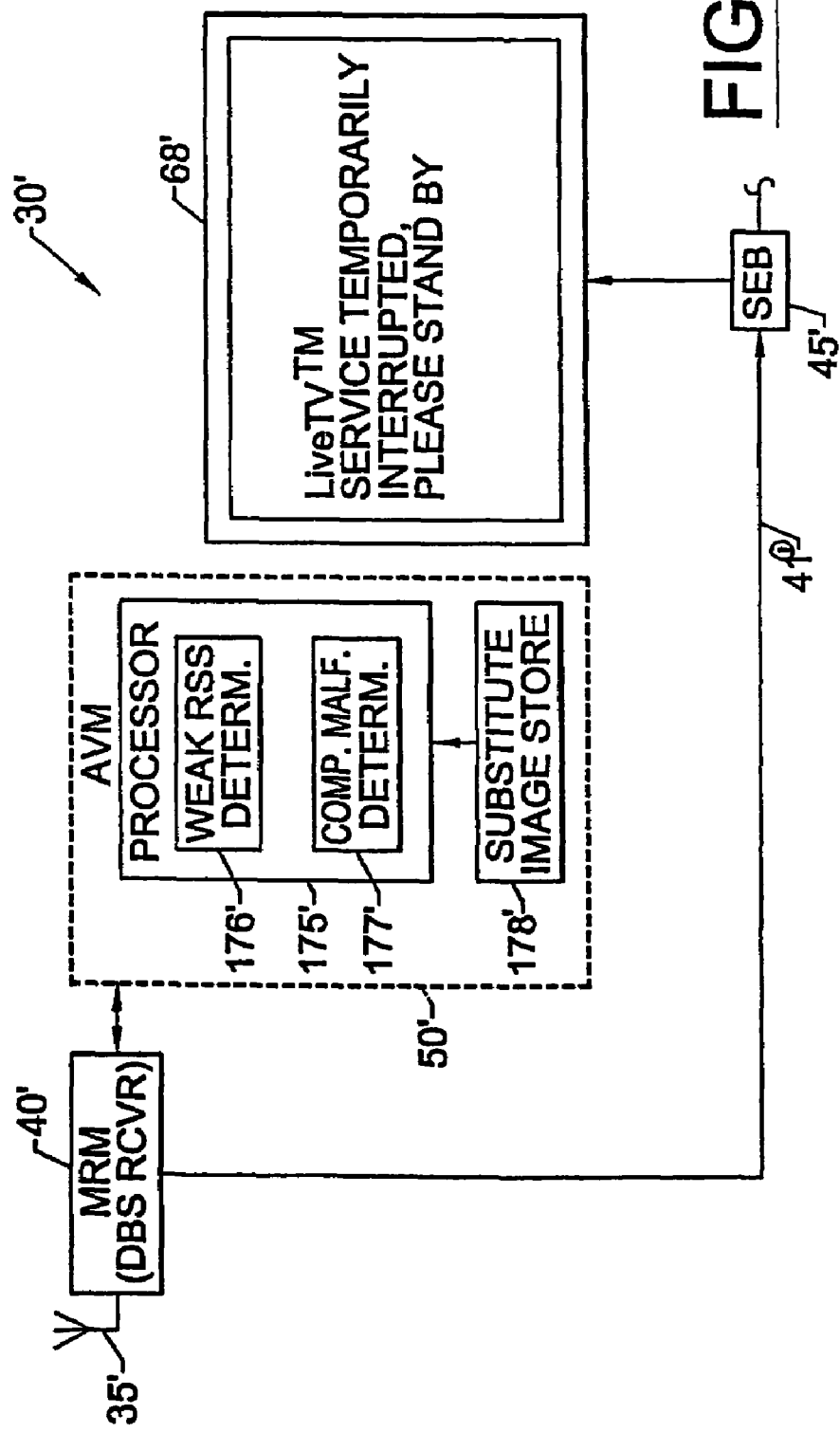
FIG. 13 is a schematic diagram of a portion of the in-flight entertainment system of the invention illustrating a soft-fail feature according to a second embodiment.

The system 30 as shown in FIG. 12 of the present invention includes a processor 175 which may detect the undesired condition in the form of a weak or absent received signal strength, and cause the passenger video display 68 to display a substitute image. More particularly, the processor 175 may be part of the AVM 50 as described above, could be part of another device, such as the MRM 40, or could be a separate device.

The processor 175 illustratively includes a circuit or portion 176 for determining a weak received signal strength as will be appreciated by those skilled in the art. Suitable circuit constructions for the weak received signal strength determining portion or circuit 176 will be readily appreciated by those skilled in the art, and require no further discussion herein. The threshold for the weak received signal strength determining portion or circuit 176 can preferably be set so as to trigger the substitute image before substantial degradation occurs, or before a text default message would otherwise be triggered, depending on the satellite service provider, as would be appreciated by those skilled in the art. In addition, the substitute image could be triggered for a single programming channel upon a weakness or loss of only that single programming channel, or may be generated across the board for all programming channels as will be readily appreciated by those skilled in the art.

In the illustrated system 30 of FIG. 12, a substitute image storage device 178 is coupled to the processor 175. This device 178 may be a digital storage device or a video tape player, for example, for causing the passenger video display 68 to show a substitute image. For example, the image could be a text message, such as "LiveTV™ Service Temporarily Unavailable, Please Stand By". Of course, other similar messages or images are also contemplated by the invention, and which tend to be helpful to the passenger in understanding a loss of programming service has occurred, but without raising unnecessary concern for the proper operation of the aircraft 31 to the passenger.

This concept of a soft failure mode, may also be carried forward or applied to a component malfunction, for example. As shown in the system 30' of FIG. 13, a component malfunctioning determining portion or circuit 177' is added to the processor 175' and can be used in combination with the weak received signal strength determining portion 176'. Of course, in other embodiments the malfunction determining circuit portion 177' could be used by itself. Again, rather than have a disconcerting image appear on the passenger's video display 68', a substitute image may be provided. Those of skill in the art will appreciate that the weak received signal strength and component malfunction are representative of types of undesired conditions that the present system 30 may determine and provide a soft failure mode for. The other elements of FIG. 13 are indicated by prime notation and are similar to those described above with respect to FIG. 12. Accordingly, these similar elements need no further discussion.

Figure 14:
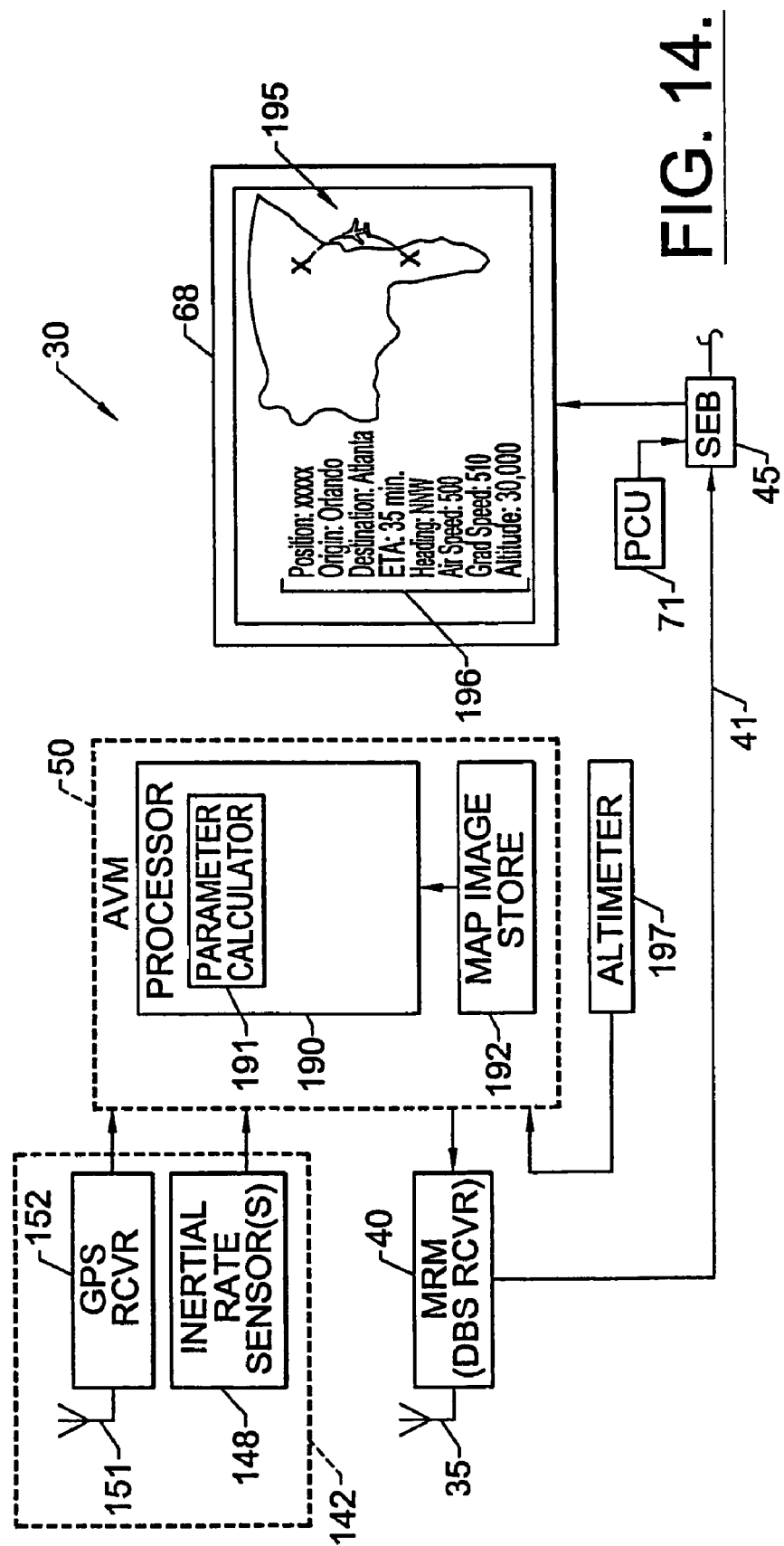
FIG. 14 is a schematic diagram of a portion of the in-flight entertainment system of the invention illustrating a moving map feature according to a first embodiment.

Yet another advantageous feature of the invention is now explained with reference to FIG. 14. Some commercial aircraft provide, on a common cabin display or overhead monitor, a simulated image of the aircraft as it moves across a map between its origin and destination. The image may also include superimposed data, such as aircraft position, speed, heading, altitude, etc. as will be appreciated by those skilled in the art.

The in-flight entertainment system 30 of the invention determines or receives the aircraft position during flight and generates a moving map image 195 of the aircraft as a flight information video channel. Various flight parameters 196 can also be displayed along with the moving map image 195. This flight information channel is offered along with the DBS programming channels during aircraft flight. In the illustrated embodiment, the passenger may select the flight information channel to be displayed on the passenger video display 68 using the passenger control unit (PCU) 71 which is typically mounted in the armrest as described above. In other words, the flight information channel is integrated along with the entertainment programming channels from the DBS system.

As shown in the illustrated embodiment, the moving map image 195 including other related text, such as the flight parameters 196, may be generated by the illustrated AVM 50 and delivered through the signal distribution network 41 to the SEB 45. Since the antenna steering controller 142 (FIG. 6) includes circuitry for determining the aircraft position, etc., these devices may be used in some embodiments for generating the moving map image as will be appreciated by those skilled in the art.

For example, the GPS receiver 152 and its antenna 151 can be used to determine the aircraft position. The GPS receiver 152 is also used to steer the antenna in this embodiment. In other embodiments a separate GPS receiver may be used as will be appreciated by those skilled in the art. As will also be appreciated by those skilled in the art, the inertial rate sensor(s) 148 of the antenna steering controller 142 may also be used in some embodiments for generating flight information.

The processor 190 illustratively includes a parameter calculator 191 for calculating the various displayed flight parameters 196 from the position signal inputs as will be appreciated by those skilled in the art. For example, the parameter calculator 191 of the processor 190 may determine at least one of an aircraft direction, aircraft speed and aircraft altitude for display with the map image. Information may also be acquired from other aircraft systems, such as an altimeter 197, for example, as will be appreciated by those skilled in the art. Also, the illustrated embodiment includes a map image storage device 192 which may include the various geographic maps used for the moving map image 195.

Weather information may also be added for display along with the moving map image 195. Further details on the generation and display of moving map images may be found in U.S. Pat. No. 5,884,219 to Curtwright et al. and U.S. Pat. No. 5,992,882 to Simpson et al., the entire disclosures of which are incorporated herein by reference.

Figure 15:
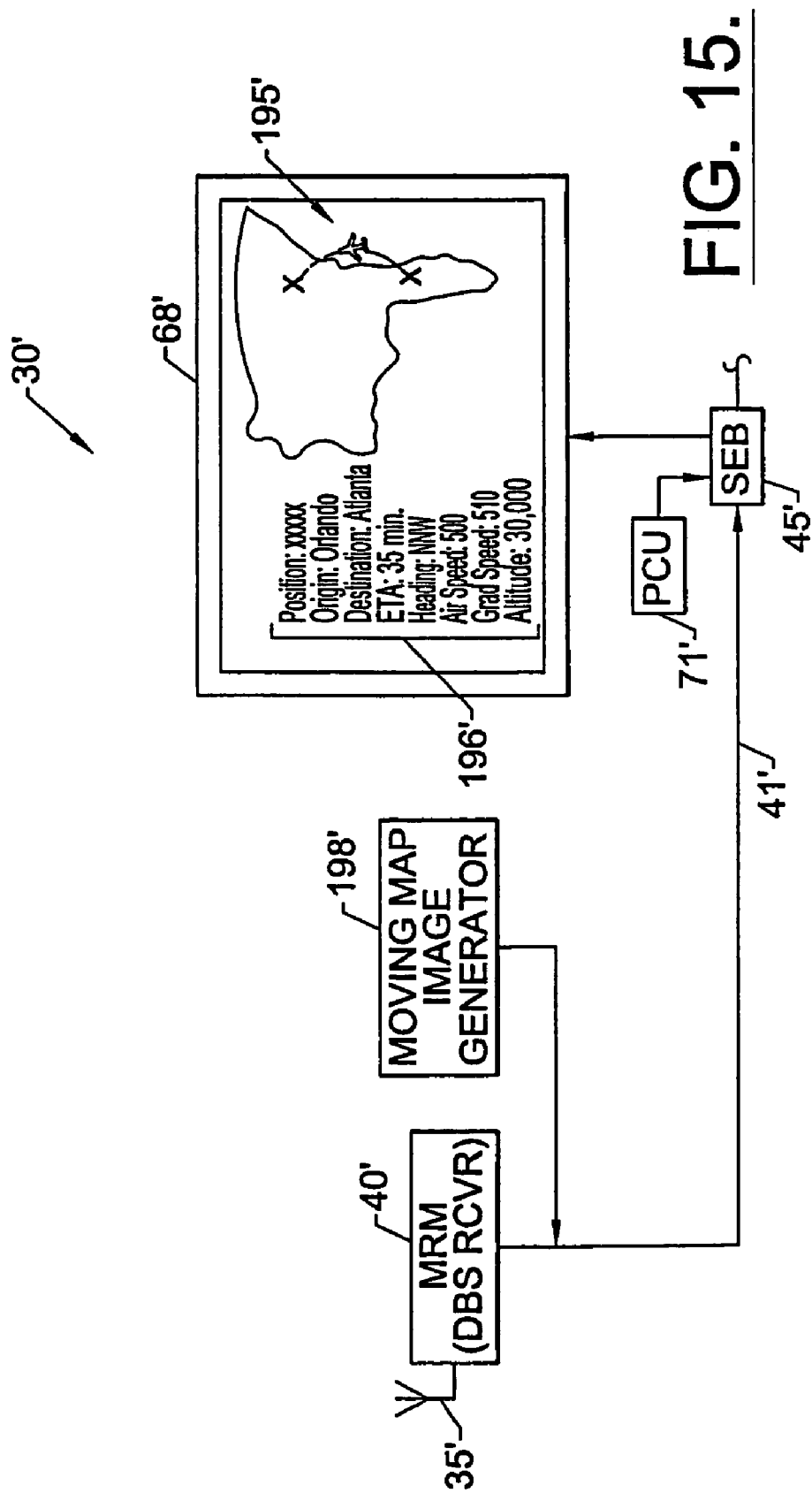
FIG. 15 is a schematic diagram of a portion of the in-flight entertainment system of the invention illustrating a moving map feature according to a second embodiment.

Referring now briefly additionally to FIG. 15, another embodiment of the system 30' including the capability to display a flight information channel among the offered DBS or satellite TV channels is now described. In this embodiment, a moving map image generator 198' is added as a separate device. In other words, in this embodiment, the flight channel signal is only carried through the distribution cable network 41' and delivered via the SEB 45' to the passenger video display 68', and there is no interface to the components of the antenna steering controller 142 as in the embodiment described with reference to FIG. 14. In this embodiment, the moving map image generator 198' may include its own position determining devices, such as a GPS receiver. Alternately, the moving map image generator 198' may also receive the position data or even the image signal from a satellite or terrestrial transmitter.

Figure 16:
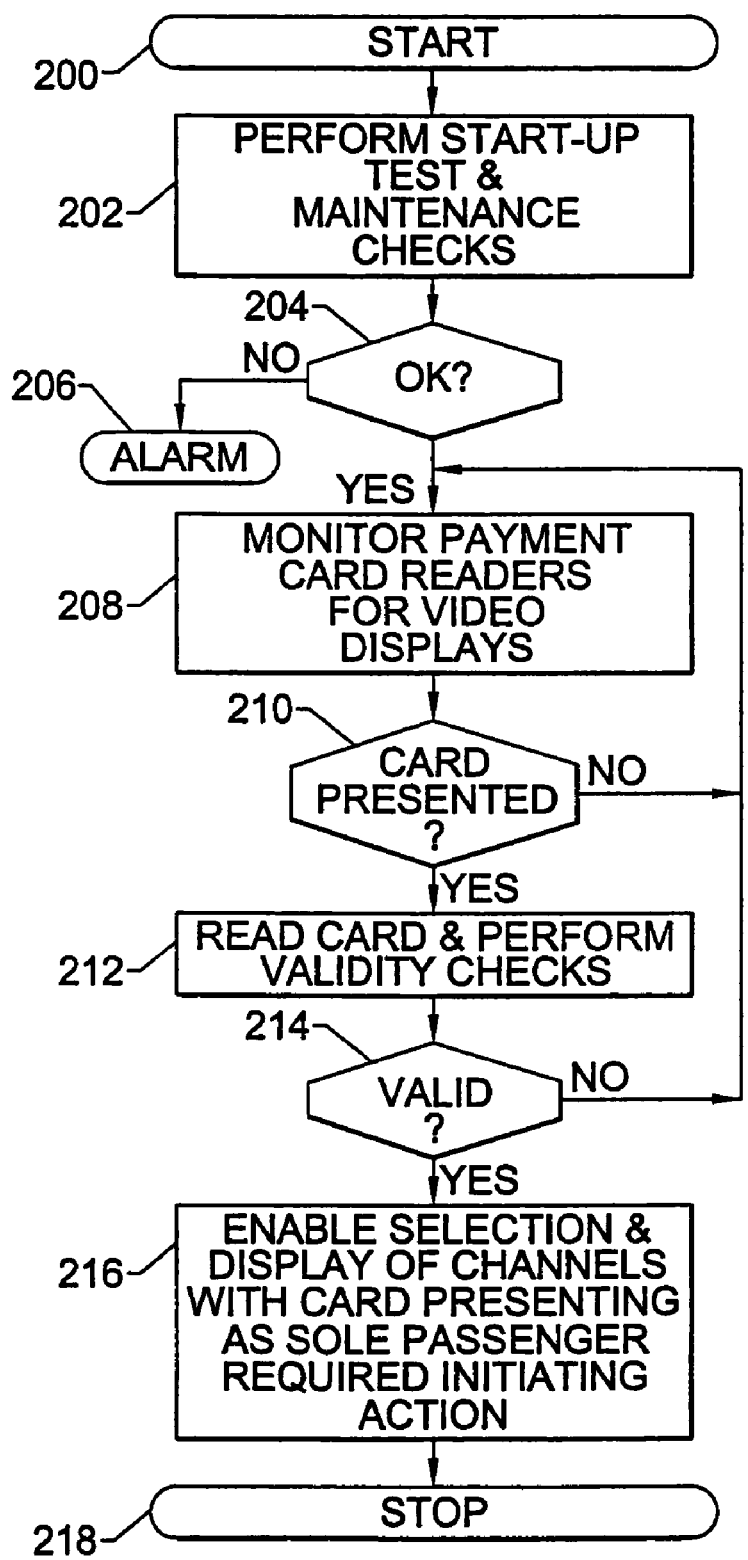
FIG. 16 is a flowchart for a method aspect of the in-flight entertainment system relating to payment and initiation of service in accordance with the invention.
Figure 17:
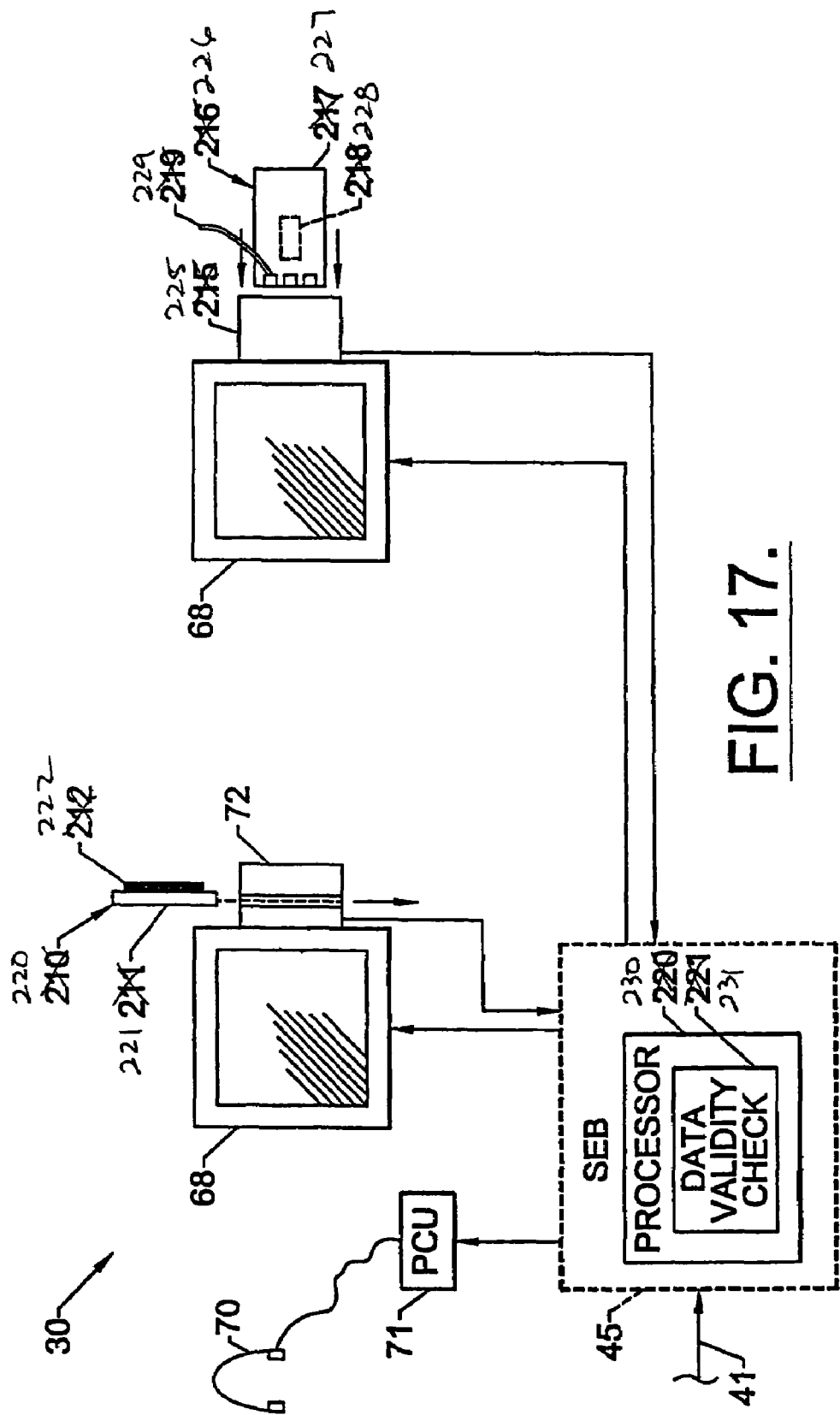
FIG. 17 is a schematic block diagram of the portion of the in-flight entertainment system relating to initiation and payment in accordance with the invention.

Referring now additionally to the flowchart of FIG. 16 and the associated schematic block diagram of FIG. 17, another advantageous aspect of the invention relating to initiation and payment is now described. In particular, from the start (Block 200), the system 30 may be first powered up and it performs its test and maintenance checks at Block 202 as will be appreciated by those skilled in the art. If the system components are determined to be operating correctly (Block 204), the payment card readers 72 are monitored at Block 208. If there is a failure, an alarm may be generated (Block 206) so that corrective action may be taken.

The payment card 220 carried and presented by the passenger for payment may be a credit card, for example, and which includes a plastic substrate 221 and a magnetic stripe 222 thereon. The payment card 220 may also be a debit card, an automated teller machine (ATM) card, a frequent flyer card, or a complimentary card provided by the airline or the entertainment service provider for example. Other types of payment cards are also contemplated by the present invention as will be appreciated by those skilled in the art. The magnetic stripe 222 includes identification information thereon, and may also include expiration data encoded as will be appreciated by those skilled in the art. In the illustrated embodiment, the card reader 72 is a swipe-type reader, wherein the passenger simply swipes the correctly oriented card 220 through a receiving channel or slot.

Other types of card readers are also contemplated by the present invention as will be appreciated by those skilled in the art. For example, the system 30 can also be readily compatible with smart card technology. A smart card reader 225 is shown in the righthand portion of FIG. 17. As will be understood by those skilled in the art, the smart card 226 may include a plastic substrate 227 which carries an integrated circuit 228. The integrated circuit 228 is read or communicated with to arrange for payment. The connection to the integrated circuit 228 may be through contacts 229 carried by the substrate 227, or can be through short range wireless coupling as will be appreciated by those skilled in the art.

In the illustrated embodiment, the passenger video display 68 is connected to the SEB 45, which in turn is connected, via the cable network 41, to the upstream DBS receiver as explained in detail above. The SEB 45 is also connected to the PCU 71 to permit user channel selection, volume control, etc. as will be appreciated by those skilled in the art. Passenger headphones 70 are also illustratively connected to the PCU 71.

On a typical narrow-body aircraft 31, the flight attendants are busy serving food and beverages during the relatively short duration of the flight. Accordingly, if the system 30 could only be manually initiated by the flight attendant after handling a cash exchange, such would be very impractical.

In accordance with the present invention, passenger and airline convenience are greatly enhanced based upon using the passenger's presentation of his payment card 220 to initiate service. In other words, returning again to the flowchart of FIG. 16, if a monitored card reader 72 is determined to have had a card 220 presented thereto (Block 210), the card is read at Block 212.

The processor 230 of the SEB 45 may perform certain basic validity checks 231 on the read data as will be appreciated by those skilled in the art. For example, the processor 230 could provide a check of the validity of the expiration date of the payment card 220. Other validity checks 231 could also be performed, although contact with an authorization center would not typically be desired. For example, the payment card type could also be checked against a preprogrammed list of acceptable or authorized card types. For example, the identifying data may indicate whether the card is an American Express, VISA, Delta Airlines, or service provider complimentary card.

In addition, a data validity or numerical sequence test, such as a CRC test, could be performed on the data to determine its validity. For example, the data may include data necessary to the financial transaction, such as the account number, person's name, expiration date, etc. and additional data which causes the data collectively to pass a certain mathematical function test. In other words, if the card 220 was invalid as determined at Block 214, service could be denied, and/or a certain number of retries could be permitted.

At Block 216, if the optional validity check is successful, the selection and display of the programming channels is enabled before stopping (Block 218). Moreover, in accordance with the invention, the only needed or required initiation input from the passenger is the presentation of a valid payment card 220. The passenger need not enter personalized passwords or hard to remember codes. Accordingly, passenger convenience is greatly enhanced. Risk of revenue loss to the airline is also relatively small since the airline has a record of the assigned passenger for each seat. In addition, the service fee is relatively small.

Although the payment reader 72 has been described for a payment card 220, the invention is also more broadly applicable to any user carried token which includes identifying date thereon for payment. Accordingly, many modifications and other embodiments of the invention will come to the mind of one skilled in the art having the benefit of the teachings presented in the foregoing descriptions and the associated drawings. In addition, other features relating to the aircraft in-flight entertainment system are disclosed in copending patent applications filed concurrently herewith and assigned to the assignee of the present invention and are entitled UPGRADABLE AIRCRAFT IN-FLIGHT ENTERTAINMENT SYSTEM AND ASSOCIATED UPGRADING METHODS, U.S. application Ser. No. 09/544,883; AIRCRAFT IN-FLIGHT ENTERTAINMENT SYSTEM HAVING ENHANCED MAINTENANCE FEATURES AND ASSOCIATED METHODS, U.S. application Ser. No. 09/544,882; AIRCRAFT IN-FLIGHT ENTERTAINMENT SYSTEM HAVING WIDEBAND ANTENNA STEERING AND ASSOCIATED METHODS, U.S. application Ser. No. 09/544,959; AIRCRAFT IN-FLIGHT ENTERTAINMENT SYSTEM HAVING ENHANCED ANTENNA STEERING AND ASSOCIATED METHODS, U.S. application Ser. No. 09/545,265; and AIRCRAFT IN-FLIGHT ENTERTAINMENT SYSTEM HAVING CONVENIENT SERVICE INITIATION AND ASSOCIATED METHODS, U.S. application Ser. No. 09/545,268, the entire disclosures of which are incorporated herein in their entirety by reference. Therefore, it is to be understood that the invention is not to be limited to the specific embodiments disclosed, and that modifications and embodiments are intended to be included within the scope of the appended claims.

That which is claimed is:

1. An aircraft in-flight entertainment system comprising:
a satellite television (TV) receiver;
a plurality of seat electronic boxes (SEBs) spaced throughout the aircraft;
a plurality of passenger video displays connected to said plurality of SEBs;
a processor connected to said satellite TV receiver for
determining a component malfunction condition within said satellite TV receiver, and
generating responsive thereto a substitute image on said plurality of passenger video displays rather than permit display of an undesired image which would otherwise be produced, the component malfunction being independent of a strength of a signal received at said satellite TV receiver; and
a storage device connected to said processor for storing the substitute image.

2. An aircraft in-flight entertainment system according to claim 1 wherein said satellite TV receiver comprises a direct broadcast satellite (DBS) receiver.

3. An aircraft in-flight entertainment system according to claim 1 wherein the undesired image is a degraded program image.

4. An aircraft in-flight entertainment system according to claim 1 wherein the undesired image is default text message image.

5. An aircraft in-flight entertainment system according to claim 1 wherein said plurality of passenger video display comprises a plurality of passenger seatback video displays.

6. An aircraft in-flight entertainment system according to claim 1 further comprising:
a plurality of signal distribution devices; and
a cable network connecting said satellite TV receiver to said signal distribution devices, and connecting said signal distribution devices to said plurality of SEBs.

7. An aircraft in-flight entertainment system according to claim 1 wherein the aircraft is a narrow-body aircraft having a single passenger aisle.

8. An aircraft in-flight entertainment system comprising:
a satellite television (TV) receiver;
a plurality of seat electronic boxes (SEBs) spaced throughout the aircraft;

a plurality of passenger video displays connected to said plurality of SEBs; and a processor connected to said satellite TV receiver for
determining a weak received signal strength condition and a component malfunction condition within said satellite TV receiver, and
generating responsive thereto a substitute image on said plurality of passenger video displays prior to display of an undesired image which would otherwise be produced, the component malfunction being independent of a strength of a signal received at said satellite TV receiver; and a storage device connected to said processor for storing the substitute image.

9. An aircraft in-flight entertainment system according to claim 8 wherein said satellite TV receiver comprises a direct broadcast satellite (DBS) receiver.

10. An aircraft in-flight entertainment system according to claim 8 wherein the undesired image is a degraded program image.

11. An aircraft in-flight entertainment system according to claim 8 wherein the undesired image is default text image.

12. An aircraft in-flight entertainment system according to claim 8 wherein said satellite TV receiver generates a plurality of individual video channels; and wherein said processor determines the undesired condition for each of the individual video channels.

13. An aircraft in-flight entertainment system according to claim 8 wherein said satellite TV receiver generates a plurality of video channels; and wherein said processor determines the undesired condition for the plurality of video channels.

14. An aircraft in-flight entertainment system according to claim 8 further comprising:
a plurality of signal distribution devices; and
a cable network connecting said satellite TV receiver to said signal distribution devices, and connecting said signal distribution devices to said plurality of SEBs.

15. An aircraft in-flight entertainment system according to claim 8 wherein the aircraft is a narrow-body aircraft having a single passenger aisle.

16. A method for operating an aircraft in-flight entertainment system comprising a satellite television (TV) receiver, a plurality of seat electronic boxes (SEBs) spaced throughout the aircraft, and a plurality of passenger video displays connected to the plurality of SEBs, the method comprising:
operating a processor connected to the satellite TV receiver for determining a weak received signal strength condition and a component malfunction condition within the satellite TV receiver, the component malfunction being independent of a strength of a signal received at the satellite TV receiver; and
generating a substitute image responsive to the determining on the plurality of passenger video displays rather than permit display of an undesired image which would otherwise be produced, with the substitute image being stored in a storage device connected to the processor.

17. A method according to claim 16 wherein the satellite TV receiver comprises a direct broadcast satellite (DBS) receiver.

18. A method according to claim 16 wherein the undesired image is a degraded program image.

19. A method according to claim 16 wherein the undesired image is default text message image.

20. A method according to claim 16 wherein the satellite TV receiver generates a plurality of individual video channels; and wherein determining comprises determining the undesired condition for each of the individual video channels.

21. A method according to claim 16 wherein the satellite TV receiver generates a plurality of video channels; and wherein determining comprises determining the undesired condition for the plurality of video channels.

22. A method according to claim 16 wherein the aircraft is a narrow-body aircraft having a single passenger aisle.

* * * * *